US008088474B2

(12) United States Patent
Quintens et al.

(10) Patent No.: US 8,088,474 B2
(45) Date of Patent: Jan. 3, 2012

(54) NON-TRANSPARENT MICROVOIDED BIAXIALLY STRETCHED FILM, ITS USE IN SYNTHETIC PAPER AND AN IMAGE RECORDING ELEMENT COMPRISING SAME

(75) Inventors: Dirk Quintens, Westerlo (BE); Peter Bries, Tremelo (BE)

(73) Assignee: Agfa-Gevaert N.V., Mortsel (BE)

( * ) Notice: Subject to any disclaimer, the term of this patent is extended or adjusted under 35 U.S.C. 154(b) by 692 days.

(21) Appl. No.: 12/050,688

(22) Filed: Mar. 18, 2008

(65) Prior Publication Data
US 2008/0241435 A1    Oct. 2, 2008

Related U.S. Application Data

(60) Provisional application No. 60/908,526, filed on Mar. 28, 2007, provisional application No. 60/908,536, filed on Mar. 28, 2007, provisional application No. 60/908,542, filed on Mar. 28, 2007, provisional application No. 60/975,300, filed on Sep. 26, 2007.

(30) Foreign Application Priority Data

| Mar. 27, 2007 | (EP) | 07104947 |
| Mar. 27, 2007 | (EP) | 07104948 |
| Mar. 27, 2007 | (EP) | 07104950 |
| Mar. 27, 2007 | (EP) | 07104953 |
| Sep. 26, 2007 | (EP) | PCT/EP2007/060218 |
| Oct. 1, 2007 | (EP) | PCT/EP2007/060359 |
| Oct. 1, 2007 | (EP) | PCT/EP2007/060373 |
| Oct. 1, 2007 | (EP) | PCT/EP2007/060380 |

(51) Int. Cl.
B32B 7/02    (2006.01)
(52) U.S. Cl. ............ 428/218; 428/304.4; 428/327; 428/480; 428/500
(58) Field of Classification Search .......... 428/218, 428/304.4, 327, 480, 500
See application file for complete search history.

(56) References Cited

U.S. PATENT DOCUMENTS

| 3,755,499 A | 8/1973 | Heijo et al. |
| 4,128,689 A | 12/1978 | Heaps et al. |
| 4,243,769 A | 1/1981 | Pritchett |
| 4,942,005 A * | 7/1990 | Pollock et al. ............ 264/45.3 |
| 5,156,709 A | 10/1992 | Mammino |
| 5,457,018 A * | 10/1995 | Sommer et al. ............ 430/533 |
| 5,660,925 A | 8/1997 | Cooley et al. |
| 5,846,918 A * | 12/1998 | Meijer et al. ............ 508/591 |
| 6,096,684 A | 8/2000 | Sasaki et al. |
| 6,703,193 B1 | 3/2004 | Laney et al. |
| 2004/0167022 A1 | 8/2004 | Laney et al. |
| 2005/0104365 A1 | 5/2005 | Haas et al. |
| 2006/0228092 A1 * | 10/2006 | Hebrink et al. ............ 385/147 |

FOREIGN PATENT DOCUMENTS

| EP | 0 436 178 A2 | 7/1991 |
| EP | 0 436 178 A3 | 7/1991 |
| EP | 0 654 506 A2 | 5/1995 |
| EP | 0 654 506 A3 | 5/1995 |
| JP | 09-255806 | 9/1997 |
| JP | 2004-196951 | 7/2004 |
| WO | WO 94/04961 A1 | 3/1994 |

OTHER PUBLICATIONS

International Search Report for PCT/EP2007/060359, dated Feb. 26, 2008.
International Search Report for PCT/EP2007/060218, dated Feb. 19, 2008.
International Search Report for PCT/EP2007/060380, dated Mar. 6, 2008.
International Search Report for PCT/EP2007/060373, dated Mar. 6, 2008.
European Search Report for EP 07104950, dated Aug. 31, 2007.

* cited by examiner

*Primary Examiner* — Betelhem Shewareged
(74) *Attorney, Agent, or Firm* — Leydig, Voit & Mayer, Ltd.

(57) ABSTRACT

A non-transparent microvoided biaxially stretched self-supporting non-laminated polymeric film, the film comprising linear polyester as a continuous phase and dispersed uniformly therein an amorphous high polymer comprising at least one chain-polymerized block with a higher glass transition temperature than the glass transition temperature of the continuous phase and isotactic poly(4-methyl-1-pentene), wherein the linear polyester consists essentially of aromatic dicarboxylate and aliphatic dimethylene monomer units, wherein the combined concentration of the uniformly dispersed amorphous high polymer and isotactic poly(4-methyl-1-pentene) in the film is 5 to 35% by weight; the use of the above-described non-transparent microvoided biaxially stretched film in synthetic paper; an image recording element comprising the above-described non-transparent microvoided biaxially stretched film; and a process for producing a transparent pattern comprising the step of: image-wise application of heat optionally supplemented by the application of pressure to the above-described non-transparent microvoided biaxially stretched film.

15 Claims, No Drawings

NON-TRANSPARENT MICROVOIDED BIAXIALLY STRETCHED FILM, ITS USE IN SYNTHETIC PAPER AND AN IMAGE RECORDING ELEMENT COMPRISING SAME

CROSS-REFERENCE TO RELATED PATENT APPLICATIONS

This application claims the benefit of U.S. Provisional Application No. 60/908,526 filed Mar. 28, 2007, U.S. Provisional Application No. 60/908,536 filed Mar. 28, 2007, U.S. Provisional Application No. 60/908,542 filed Mar. 28, 2007 and U.S. Provisional Application No. 60/975,300 filed Sep. 26, 2007, which are all incorporated by reference. In addition, this application claims the benefit of European Application No. 07104953.0 filed Mar. 28, 2008, European Application No. 07104947.2 filed Mar. 28, 2007, European Application No. EP 07104948.0 filed Mar. 28, 2007, European Application No. 07104950.6 filed Mar. 28, 2007, PCT Application No. PCT/EP07/060,359 filed Oct. 1, 2007, PCT/EP07/060, 218 filed Sep. 26, 2007, PCT/EP07/060,380 filed Oct. 1, 2007 and PCT/EP07/060,373 filed Oct. 1, 2007, which are all also incorporated by reference.

FIELD OF THE INVENTION

The present invention concerns non-transparent microvoided biaxially stretched films, its use in synthetic paper and an image recording element comprising the films.

BACKGROUND OF THE INVENTION

U.S. Pat. No. 3,755,499 discloses a synthetic sheet for writing purposes which consists essentially of a linear polyester selected from the group consisting of polyethylene terephthalate, polyethylene isophthalate, and copolymers of ethylene terephthalate and ethylene isophthalate, and a high polymer having a higher glass transition point than that of said linear polyester at a mixing ration of from 7 to 35% by weight of the latter with respect to the polymer mixture, which high polymer is selected from the group consisting of a polymethylmethacrylate, a copolymer of acrylonitrile an styrene, a copolymer of acrylonitrile, butadiene and styrene, said synthetic sheet having a very finely coarsened surface due to said high polymer which is uniformly dispersed in said linear polyester to constitute the nuclei for the irregular surface thereof. Both simultaneous and sequential stretching of these mixed polymer materials are disclosed usually at 85 to 95° C. with stretching ratios from 2 to 3.5 times the original length, the sheet being adjusted for writability and opacity in conformity with its eventual use. The object of the invention of U.S. Pat. No. 3,755,499 is stated to be the provision of a synthetic sheet for writing and similar other purposes having improved surface condition, opacity, and other requisite properties. U.S. Pat. No. 3,755,499 further discloses that the thermoplastic resin to be mixed may or may not have compatibility with the linear polyester, provided that it can be substantially uniformly mixed with and dispersed in the linear polyester at the time of forming, that the formed film, regardless of whether it is transparent or not, may produce a uniform mat surface upon being stretched and the film thus obtained is heat-shrinkable, acceptable in its writing properties, and possesses adequate opacity and that in order to further improve stability in the film size at a high temperature, it may be heat-treated at a temperature above the stretching temperature of the linear polyester and below the melting point of both mixing thermoplastic resin and the linear polyester. U.S. Pat. No. 3,755,499 fails to disclose the influence of addition of an inorganic opacifying pigment or the simultaneous addition of poly(4-methyl-1-pentene).

U.S. Pat. No. 4,128,689 discloses a process for preparing thermoplastic sheets or webs, which process comprises the steps of: (i) extruding a foamable thermoplastic polymer mixture through the die of a screw extruder to produce a foamed extrudate in sheet or web form, the foamable thermoplastic polymer mixture containing at least a first and a second thermoplastic polymer, the first thermoplastic polymer being substantially crystalline and having a higher melting point than, and being substantially immiscible with, the second thermoplastic polymer, and the temperature of extrusion being equal to or greater than the melting point of the first thermoplastic polymer; (ii) stretching the foamed extrudate from step (i) in the direction of extrusion as it leaves the die to rupture most of the cells of the foamed extrudate and to elongate the walls of the collapsed cells in the direction of stretch; (iii) compressing the stretched extrudate from step (ii) while it remains plastic; and (iv) cooling and foamed, stretched and compressed extrudate from step (iii). Furthermore, U.S. Pat. No. 4,128,689 discloses that the first thermoplastic polymer is preferably selected from high density polyethylene, polypropylene, polybutene-1, poly 4-methylpentene-1, polyethylene terephthalate, nylon 6, nylon 66 and nylon 11 and the second thermoplastic polymer is preferably a non-crystalline thermoplastic polymer preferably selected from cellulose acetate, cellulose propionate, cellulose acetate butyrate, ethyl cellulose, polystyrene, styrene-acrylonitrile copolymers, polycarbonates, styrene and methyl styrene copolymers and phenylene oxide polymers.

U.S. Pat. No. 4,243,769 discloses a method for providing a grossly homogeneous, permanently miscible mixture of polymers which has properties not evident in a simple blend of the polymers and which does not separate spontaneously into the component polymers, which comprises uniformly mixing (a) a polymer component containing a nitrile functionality with (b) a polymer component containing hydroxyl or esterified hydroxyl functional groups condensable with nitrites, said polymer components (a) and (b) tending to spontaneously separate from a simple blend thereof, in the presence of from about 0.001 to 8 percent by weight of the mixture of polymers and acid of an acid compatibilizing agent and for a period sufficient to provide the aforesaid permanently miscible mixture of polymers which, at ambient temperature, is in the form of a solid.

EP 0 436 178A2 discloses a polymeric shaped article characterized in that said article is comprised of a continuous oriented polymer matrix having dispersed therein microbeads of a cross-linked polymer which are at least partially bordered by void space, said microbeads being present in an amount of 5-50% by weight based on the weight of said oriented polymer, said void space occupying 2-60% by volume of said article.

EP-A 0 654 503 discloses a shaped article prepared from a polymer blend of 50 to 97 wt. % of a linear polyester and 3 to 50 wt. % of a polymer containing styrene e.g. a graft polymer of acrylonitrile, butadiene and styrene (ABS), a styrene-acrylonitrile copolymer or a high impact polystyrene (HIPS), wherein the percentages relate to the sum of the polyester and the polymer containing styrene. EP-A 0 654 503 further discloses that the support material according to the invention may contain further additives, for example pigments, in particular $TiO_2$, $BaSO_4$, $CaCO_3$, optical whiteners or blue dyes, which further increase covering power and improve sharpness, in particular 0.5 to 10 wt. %, related to the total weight of the constituent used, preferably 2 to 10, preferably 3.5 to 6.5 wt. % of $TiO_2$ pigment, preferably of the anatase type, are added.

U.S. Pat. No. 6,096,684 discloses A porous polyester film having an apparent specific gravity of less than 1.3, which comprises a polyester film having many voids [layer (A)] comprising a polyester and a thermoplastic resin incompatible with said polyester, and a polyester film having many fine voids [layer (B)] comprising a polyester and inorganic fine particles having an average particle size of less than 1 μm, the two layers being bonded to each other, wherein the layer (B) has a porosity of not less than 20% by volume, and a thickness of 1-20 μm that is less than 30% of the thickness of the porous film. U.S. Pat. No. 6,096,684 further discloses that preferably the porous polyester film wherein the thermoplastic resin incompatible with polyester in layer (A) includes polystyrene resin, polymethylpentene resin and polypropylene resin, and a polystyrene resin content (X wt %), a polymethylpentene resin content (Y wt %) and a polypropylene resin content (Z wt %) satisfy the following equations: $0.01 \leq X/(Y+Z) \leq 1$; $Z/Y \leq 1$; $5 \leq X+Y+Z \leq 30$.

U.S. Pat. No. 6,703,193 discloses an image recording element comprising a microvoided layer comprising a continuous phase polyester matrix having dispersed therein crosslinked organic microbeads and non-crosslinked polymer particles that are immiscible with the polyester matrix of said microvoided layer. U.S. Pat. No. 6,703,193 further discloses that if only non-crosslinked polymer particles that are immiscible with the polyester matrix are used in the microvoided layer of a silver halide display media the raw material and manufacturing cost is low, as a compounding step is not required, but the image sharpness is very poor due to the relatively large voids that result. Thus although the use of immiscible polymer particles as voiding agents in imaging median is attractive from a cost standpoint, the quality with respect to sharpness is prohibitively inferior. U.S. Pat. No. 6,703,193 also discloses that it has been unexpectedly discovered that by mixing both the crosslinked organic microbeads and the non-crosslinked polymer particles that are immiscible with polyester into the polyester matrix of the microvoided layer the deficiencies of the void initiators when used singularly are synergistically overcome, especially with respect to image quality and manufacturability. The combination of crosslinked organic beads and non-crosslinked polymer particles immiscible in a polyester matrix enjoys the quality, with respect to sharpness of microbead-voided media, without the expected degradation associated with the addition of a material with poor sharpness quality, with significant cost reductions and manufacturing time and effort reductions resulting from the need to use less costly raw material which in turn lowers the time and effort needed to compound microbeads with matrix polymer. U.S. Pat. No. 6,703,193 also discloses that the voided layer may contain white pigments which are known to improve the photographic responses such as whiteness or sharpness such as titanium dioxide, barium sulphate, clay, calcium carbonate or silica; and that addenda may be added to the layers to change the color of the imaging element. U.S. Pat. No. 6,703,193 fails to disclose the influence of image-wise heating on the opaque microvoided films disclosed therein.

The prior art non-transparent microvoided biaxially stretched film has suffered from insufficient opacity together with a lack of dimensional stability or sufficient dimensional stability and insufficient opacity or sufficient opacity and poor mechanical properties such as tear strength after longitudinal stretching and after biaxial stretching. Moreover, for particular applications the whiteness of the non-transparent microvoided biaxially stretched film was insufficient.

ASPECTS OF THE INVENTION

It is therefore an aspect of the present invention to provide an improved non-transparent microvoided biaxially stretched film.

It is therefore a further aspect of the present invention to provide a process for producing an improved non-transparent microvoided biaxially stretched film.

It is therefore also an aspect of the present invention to provide a process for obtaining a transparent pattern in a non-transparent microvoided biaxially stretched film.

Further aspects and advantages of the invention will become apparent from the description hereinafter.

SUMMARY OF THE INVENTION

It has been surprisingly found that non-transparent microvoided biaxially stretched polymeric films having linear aromatic polyester as a continuous phase and dispersed uniformly therein an amorphous high polymer comprising at least one chain-polymerized block with a higher glass transition temperature than the glass transition temperature of the continuous phase, e.g. a SAN-polymer, and isotactic poly(4-methyl-1-pentene) (PMP) exhibit particularly beneficial properties over non-transparent microvoided biaxially stretched polymeric films having linear aromatic polyester as a continuous phase and dispersed uniformly therein an amorphous high polymer comprising at least one chain-polymerized block with a higher glass transition temperature than the glass transition temperature of the continuous phase, e.g. a SAN-polymer, and non-transparent microvoided biaxially stretched polymeric films having linear aromatic polyester as a continuous phase and dispersed uniformly therein isotactic poly(4-methyl-1-pentene) (PMP). Such properties include an increased tear strength after longitudinal stretching and after biaxial stretching; and higher optical densities and improved insulation properties due to increased microvoiding.

Aspects of the present invention are realized by a non-transparent microvoided biaxially stretched self-supporting non-laminated polymeric film, the film comprising linear polyester as a continuous phase and dispersed uniformly therein an amorphous high polymer comprising at least one chain-polymerized block with a higher glass transition temperature than the glass transition temperature of the continuous phase and isotactic poly(4-methyl-1-pentene), wherein the linear polyester consists essentially of aromatic dicarboxylate and aliphatic dimethylene monomer units, wherein the combined concentration of the uniformly dispersed amorphous high polymer and isotactic poly(4-methyl-1-pentene) in the film is 5 to 35% by weight.

Aspects of the present invention are also realized by the use of the above-described non-transparent microvoided biaxially stretched film in synthetic paper.

Aspects of the present invention are also realized by an image recording element comprising the above-described non-transparent microvoided biaxially stretched film.

Aspects of the present invention are also realized by a process for producing a transparent pattern comprising the step of: image-wise application of heat optionally supplemented by the application of pressure to the above-described non-transparent microvoided biaxially stretched film.

Preferred embodiments of the present invention are disclosed in the detailed description of the invention.

DETAILED DESCRIPTION OF THE INVENTION

Definitions

The term voids or microvoids, as used in disclosing the present invention, means microcells, minute closed cells, cavities, bubbles or pores or cellulation, which, for example, can be formed in an oriented polymeric film during stretching as the result of a void-initiating particle initiated by particles that are immiscible with the polyester matrix. The voids or microvoids can be unfilled or filled with air or a vapour of some sort. Even if initially unfilled the voids or microvoids may over time become filled with air or a vapour of some sort.

The term "opaque", means a percentage opacity to visible light of greater than 90% as determined according to ASTM D589-97 or according to opacity test T425m-60 as published by TAPPI, 360 Lexington Avenue, New York, USA.

The term film, as used in disclosing the present invention, is an extruded sheet of a particular composition or a sheet consisting of a multiplicity of films with the same or different compositions produced by co-extrusion of liquids with the same or different compositions in contact with one another. The terms film and foil are used interchangeably in the present disclosure.

The term foam, as used in disclosing the present invention, means a substance that is formed by trapping many gas bubbles in a liquid or solid.

The term dicarboxylate monomer unit in a linear polyester, as used in disclosing the present invention, means a monomer unit derived either from a dicarboxylic acid or an ester thereof.

The term dimethylene aliphatic monomer unit in a linear polyester, as used in disclosing the present invention, means a monomer unit derived from a dimethylene aliphatic diol or an ether thereof, wherein the term aliphatic includes alicylic.

The term linear polyester, as used in disclosing the present invention, means a polyester comprising hydrocarbon dimethylene and dicarboxylate monomer units.

The term linear aromatic polyester, as used in disclosing the present invention, means a polyester comprising aliphatic dimethylene and aromatic dicarboxylate monomer units.

The term apparent density, as used in disclosing the present invention, means the weight of a 100 mm×100 mm piece of film with a thickness measured in contact with an inductive probe with ball tip 3 mm in diameter divided by its volume. This value assumes that the surfaces of the piece of film are flat and parallel to one another. This value corresponds to the apparent density values reported in EP-A 0 496 323 and WO 2005/105903A.

The term inorganic opacifying pigment, as used in disclosing the present application, means a pigment capable of opacifying (i.e. rendering more opaque) which includes substantially white inorganic pigments having a refractive index of at least 1.4 and pigments, which as a dispersion in a polymer are capable upon stretching of causing opacity due to microvoiding.

The term whitening agent, as used in disclosing the present invention, means a white/colourless organic compound which exhibits a blue luminescence under the influence of ambient UV-light.

The term "support", as used in disclosing the present invention, means a "self-supporting material" so as to distinguish it from a "layer" which may be coated as a solution or dispersion, evaporated or sputtered on a support, but which itself is not self-supporting. It also includes an optional conductive surface layer and any treatment necessary for, or layer applied to aid, adhesion.

The term "axially stretched", as used in disclosing the present invention, is a generic term referring to the axial stretching process and includes the possibility of stretching in one or more directions.

The term "chain-polymerized block", as used in disclosing the present invention, excludes condensation polymers and means a chain-polymerized polymer chain which may a block in a block copolymer or graft copolymer or may just be a chain-polymerized polymer chain.

The term overprintable, as used in disclosing the present invention, means capable of being overprinted by conventional impact and/or non-impact printing processes.

The term conventional printing processes, as used in disclosing the present invention, includes but is not restricted to ink-jet printing, intaglio printing, screen printing, flexographic printing, offset printing, stamp printing, gravure printing, dye transfer printing, thermal sublimation printing and thermal and laser-induced processes.

The term pattern, as used in disclosing the present invention, means a non-continuous layer which can be in any form of lines, squares, circles or any random configuration.

The term layer, as used in disclosing the present invention, means a (continuous) coating covering the whole area of the entity referred to e.g. a support.

The term "non-transparent film", as used in disclosing the present invention, means a film capable of providing sufficient contrast to a transparent image to make the image clearly perceptible. A non-transparent film can be an "opaque film", but need not necessarily be completely opaque in that there is no residual translucence i.e. no light penetration through the film. Optical density in transmission as measured with a MacBeth TR924 densitometer through a visible filter can provide a measure of the non-transparency of a film. ISO 2471 concerns the opacity of paper backing and is applicable when that property of a paper is involved that governs the extent to which one sheet visually obscures printed matter on underlying sheets of similar paper and defines opacity as "the ratio, expressed as a percentage, of the luminous reflectance factor of a single sheet of the paper with a black backing to the intrinsic luminous reflectance factor of the same sample with a white reflecting backing. 80 g/m$^2$ copy paper, for example, is white, non-transparent and has an optical density of 0.5 as measured with a MacBeth TR924 densitometer through a yellow filter according to ISO 5-2 and metallized films typically have an optical density ranging from 2.0 to 3.0.

The term transparent, as used in disclosing the present invention, means having the property of transmitting at least 50% of the incident visible light without diffusing it and preferably at least 70% of the incident visible light without diffusing it.

The term flexible, as used in disclosing the present invention, means capable of following the curvature of a curved object such as a drum e.g. without being damaged.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the dispersion medium under the pertaining ambient conditions, hence having a solubility of less than 10 mg/L therein.

Non-Transparent Microvoided Biaxially Stretched Self-Supporting Non-Laminated Polymeric Film Aspects of the present invention are realized by a non-transparent microvoided biaxially stretched self-supporting non-laminated polymeric film, the film comprising linear polyester as a continuous phase and dispersed uniformly therein an amorphous high polymer comprising at least one chain-polymerized block with a higher glass transition temperature than the glass transition temperature of the continuous phase and isotactic poly(4-methyl-1-pentene), wherein the linear polyester consists essentially of aromatic dicarboxylate and aliphatic dimethylene monomer units, wherein the combined concentration of the uniformly dispersed amorphous high polymer and isotactic poly(4-methyl-1-pentene) in the film is 5 to 35% by weight, with 10 to 25% by weight being preferred. The aromatic dicarboxylate monomer units are derived from aromatic dicarboxylic acids or aromatic dicarboxylic acid esters and the aliphatic dimethylene monomer units are derived from aliphatic diols or aliphatic diol ethers.

According to a first embodiment of the non-transparent microvoided biaxially stretched self-supporting non-laminated polymeric film, according to the present invention, the concentration of isotactic poly(4-methyl-1-pentene is 15% by weight or less, with 10% by weight or less being preferred.

According to a second embodiment of the non-transparent microvoided biaxially stretched self-supporting non-laminated polymeric film, according to the present invention, the concentration of isotactic poly(4-methyl-1-pentene is at least 0.02% by weight, with 0.1% by weight being preferred and 0.2% by weight being particularly preferred.

According to a third embodiment of the non-transparent microvoided biaxially stretched self-supporting non-laminated polymeric film, according to the present invention, the uniformly dispersed amorphous high polymer in the continuous phase is present as particles with a diameter of 20 µm or less, with particles having a number average particle size of 0.5 to 5 µm being preferred and particles with an average particle size of 1 to 2 µm being particularly preferred. The smaller the particle size, the higher the opacity.

According to a fourth embodiment of the non-transparent microvoided biaxially stretched self-supporting non-laminated polymeric film, according to the present invention, the film further comprises an ingredient selected from the group consisting of whitening agents, UV-absorbers, light stabilizers, antioxidants, flame retardants and colorants.

According to a fifth embodiment of the non-transparent microvoided biaxially stretched self-supporting non-laminated polymeric film, according to the present invention, the film has an apparent density of 1.1 g/mL or less.

According to a sixth embodiment of the non-transparent microvoided biaxially stretched self-supporting non-laminated polymeric film, according to the present invention, the polymer film is exclusive of a polyether such as polyethylene oxide. Such polyethers decrease the density and may decompose producing additional non-uniformly distributed voids.

According to a seventh embodiment of the non-transparent microvoided biaxially stretched self-supporting non-laminated polymeric film, according to the present invention, the polymer film is a coextrudate. Coextrusion comprises feeding at least two polymeric film compositions into separate extruders, laminating the compositions in a molten state and extruding them from a die. At least one of the coextruded layers will have a linear polyester as a continuous phase and dispersed uniformly therein an amorphous high polymer with a higher glass transition temperature than the glass transition temperature of the continuous phase and/or a crystalline high polymer having a higher melting point than the glass transition temperature of the continuous phase.

According to an eighth embodiment of the non-transparent microvoided biaxially stretched self-supporting non-laminated polymeric film, according to the present invention, the polymeric film is provided with at least one of alphanumeric characters, an embossed pattern, an optionally embossed hologram and a continuous, half-tone or digital image.

According to a ninth embodiment of the non-transparent microvoided biaxially stretched self-supporting non-laminated polymeric film, according to the present invention, the film is provided on at least one side with an overprintable layer i.e. suitable for impact or non-impact printing, the overprintable layer being preferably suitable for impact printing e.g. intaglio printing, screen printing, flexographic printing, offset printing, stamp printing and gravure printing.

According to a tenth embodiment of the non-transparent microvoided biaxially stretched self-supporting non-laminated polymeric film, according to the present invention, the film is provided on at least one side with a transparent overprintable layer i.e. suitable for impact or non-impact printing. This transparent overprintable layer can be provided over at least one of alphanumeric characters, an embossed pattern, an optionally embossed hologram and a continuous, half-tone or digital image on a surface of the non-transparent microvoided biaxially stretched self-supporting film.

According to an eleventh embodiment of the non-transparent microvoided biaxially stretched self-supporting non-laminated polymeric film, according to the present invention, the film is provided on at least one side with a transparentizable porous overprintable layer i.e. suitable for impact or non-impact printing e.g. ink-jet printing. Transparentizable porous layers transparentized by the application of a liquid with an appropriate refractive index, which can also be applied image-wise, are as disclosed in EP-A 1 362 710 and EP-A 1 398 175. This transparentizable overprintable layer can be provided over at least one of alphanumeric characters, an embossed pattern, an optionally embossed hologram and a continuous, half-tone or digital image on a surface of the non-transparent microvoided biaxially stretched self-supporting film with a transparent pattern.

Transparentization of part of the transparentizable porous receiving layer can itself produce an image or the non-transparentized area of the opaque porous receiving layer can itself represent an image. The transparent pattern can, for example, be part of a banknote, a share certificate, a ticket, a credit card, an identity document or a label for luggage and packages.

According to a twelfth embodiment of the non-transparent microvoided biaxially stretched self-supporting non-laminated polymeric film, according to the present invention, the polymeric film has a thickness in the range from about 10 µm to about 500 µm, with from about 50 µm to about 300 µm being preferred.

According to a thirteenth embodiment of the non-transparent microvoided biaxially stretched self-supporting non-laminated polymeric film, according to the present invention, the polymeric film is provided with a subbing layer. This subbing layer makes it possible to improve wettability and adhesive property of the polymeric film and preferably comprises a polyester resin, a polyurethane resin, a poly(ester urethane) resin or an acrylic resin.

The polymeric film, according to the present invention, can be realized by a process for preparing a non-transparent microvoided biaxially stretched film comprising the steps of:
i) mixing at least one linear polyester having monomer components consisting essentially of at least one aromatic dicarboxylic acid and at least one aliphatic diol and an amorphous high polymer with a higher glass transition temperature than the glass transition temperature of the continuous phase and/or a crystalline high polymer having a higher melting point than the glass transition temperature of the continuous phase and optionally at least one ingredient from the group of ingredients consisting of inorganic opacifying pigments, whitening agents, UV-absorbers, light stabilizers, antioxidants and flame retardants in a kneader or an extruder, ii) forming the mixture produced in step i) in a thick film followed by quenching to room temperature; iii) longitudinally stretching the thick film at a stretching tension of >4 N/mm² at a temperature between the glass transition temperature of the amorphous polymer and the glass transition temperature of the linear polyester or between the melting point of the crystalline polymer and the glass transition temperature of the linear polyester to at least twice the initial length; and iv) transversally stretching the longitudinally stretched film from step (iii) at a stretching tension of >4 N/mm² at a temperature between the glass transition temperature of the amorphous polymer and the glass transition temperature of the linear polyester or between the melting point of the crystalline polymer and the glass transition temperature of the linear polyester to at least twice the initial length, wherein the weight ratio of the linear polyester to the amorphous polymer or crystalline polymer is in the range 1.85:1 to 19.0:1.

The quenched extruded thick film has a thickness of approximately 10 to approximately 6000 µm, with a thickness of approximately 100 µm to 5000 µm being preferred.

The biaxially stretched polymeric film, according to the present invention, is realized by first stretching in one direction (e.g. in the machine direction=MD) and then stretching in a second direction [e.g. perpendicularly to the machine direction=TD (transversal direction)]. This orients the polymer chains thereby increasing the density and crystallinity. Longitudinal orientation in the direction of extrusion can be carried out with the aid of two rolls running at different speeds corresponding to the desired stretching ratio by setting the surface speed V2 of the rotating rollers relative to the linear extrusion speed V1 so that the stretch ratio is V2/V1. The longitudinal stretching ratio should be sufficient to create voids.

The longitudinal stretching operations known in the art to produce biaxially oriented polyester film may be used. For instance, the combined film layers are passed between a pair of infra red heaters which heats the layers to a temperature above the glass transition temperature of the polyester (about 80° C. for polyethylene terephthalate) in the region where the stretching occurs. The temperature above should be close to the glass transition temperature of the continuous phase polymer in order to improve opacity. In the case of polyethylene terephthalate, the longitudinal stretching is generally carried out at from about 80 to about 130° C. During longitudinal stretching opacity is realized as a result of the voids produced in the film extending longitudinally from each particle of dispersed polymer.

Transverse stretching is carried out at an angle substantially 90° to the direction of longitudinal stretching, with the angle being typically between about 70° and 90°. For transverse orientation use is generally made of an appropriate tenter frame, clamping both edges of the film and then drawing toward the two sides by heating the combined layers with the primer layer(s) thereon by, for example, passing through hot air heaters which heat the film above the glass transition temperature. In the case of polyethylene terephthalate and its copolymers, the transverse stretching is carried out at from about 80 to about 170° C., with from about 85 to about 150° being preferred. The transverse stretching of the film causes the voids to extend transversely.

The production of the biaxially stretched polymeric film, according to the present invention, is preferably produced by longitudinally stretching the thick film at a stretching tension >2.5 N/mm², with a stretching tension >5.0 N/mm² being preferred and a stretching tension >7.0 N/mm² being particularly preferred. After optional intermediate quenching the longitudinal stretching is followed by transverse stretching at an angle substantially 90° to the first stretching process to at least twice the initial length at a stretching tension of >2.5 N/mm², with a stretching tension of >4.0 N/mm² being preferred, at a temperature preferably at or below 30° C. above the glass transition temperature of the continuous phase and preferably at or below 20° C. above the glass transition temperature of the continuous phase. The realizable stretching tension increases with decreasing stretching temperature.

Longitudinal and transverse stretching may be performed simultaneously e.g. with an apparatus produced by Brückner.

The production process may further comprise, as a further step, a thermal fixation step to counter shrinkage.

The stretching ratio for longitudinal stretching is preferably between about 2 and about 6, with between about 2.5 and about 5 being preferred and between 3 and 4 being particularly preferred. The higher the stretching ratio, the higher is the opacity.

Transverse stretching ratio is preferably in the range of from about 2 to about 6, with a range of 2.5 to about 5 being preferred and a range of from about 3 to about 4 being particularly preferred. The opacity increases at higher stretching rates in %/min and also at lower transverse stretching temperatures.

The biaxially stretched film is finally passed through a second set of hot air heaters which blow hot air at a temperature of between 140 and 240° C. onto the film layers to heat-set or thermofix the film layers. The heat-set temperature must be sufficient to obtain crystallization of the polyester but care must be taken not to overheat the layers since the voids can collapse. On the other hand increasing the heat-set temperature improves the dimensional stability of the film. An appropriate mix of properties can be obtained by varying the heat-set temperature. The preferred heat-set or thermofixation temperature in the case of polyethylene terephthalate or polyethylene naphthalate is at or above 140° C.

Before or after longitudinal stretching a first subbing layer, called a primer layer, may be applied to the non-voided polyester layer by a coating means such as an air knife coating system. The first subbing layer is for example formed from a (meth)acrylate copolymer, a poly(meth)acrylate, a polyurethane, a sulphonated polyester, a styrene-(meth)acrylate copolymer or a chloride containing copolymer such as vinylidene chloride copolymer in latex form having some hydrophilic functionality through the presence of a copolymerized unsaturated carboxylic acid which is applied as an aqueous dispersion.

According to a fourteenth embodiment of the non-transparent microvoided biaxially stretched self-supporting non-laminated polymeric film, according to the present invention, the polymeric film is exclusive of foam.

According to a fifteenth embodiment of the non-transparent microvoided biaxially stretched self-supporting non-laminated polymeric film, according to the present invention, the polymeric film is exclusive of foaming agent and/or decomposition products of a foaming agent.

Optical Density of the Film Due to Microvoids

The optical density of the film measured in transmission with a visible filter due to microvoids is obtained by measuring the optical density of the film without void-producing ingredients as a function of film thickness to provide comparative values. The optical density of a film measured in transmission with a visible filter due to voids is then obtained by biaxially stretching a composition to which has been added the void-inducing ingredient and subtracting the measured optical density measured in transmission with a visible filter from the optical density measured in transmission with a visible filter for the film composition without void-inducing ingredient for the film thickness expected on the basis of the longitudinal and transverse drawing ratios.

Linear Polyester

According to a sixteenth embodiment of the non-transparent microvoided biaxially stretched self-supporting non-laminated polymeric film, according to the present invention, the number average molecular weight of the linear polyester is 10,000 to 30,000.

According to a seventeenth embodiment of the non-transparent microvoided biaxially stretched self-supporting non-laminated polymeric film, according to the present invention, the linear polyester is poly(ethylene terephthalate) or a copolymer thereof.

Examples of suitable aromatic dicarboxylates include terephthalate, isophthalate, phthalate and naphthalene dicarboxylates, and mixtures thereof.

According to an eighteenth embodiment of the non-transparent microvoided biaxially stretched self-supporting non-laminated polymeric film, according to the present invention, the aromatic dicarboxylate monomer units are selected from the group consisting of terephthalate, isophthalate and naphthalene dicarboxylates.

According to a nineteenth embodiment of the non-transparent microvoided biaxially stretched self-supporting non-laminated polymeric film, according to the present invention, at least 1 mole % of the aromatic dicarboxylate monomer units in the linear polyester are isophthalate monomer units, with at least 3 mole % being preferred and at least 5 mole % being particularly preferred.

According to a twentieth embodiment of the non-transparent microvoided biaxially stretched self-supporting non-laminated polymeric film, according to the present invention, 30 mole % or less of the aromatic dicarboxylate acid monomer units in the linear polyester are isophthalate monomer units, with 20 mole % or less being preferred, 18 mole % or less being particularly preferred and 15% or less being especially preferred.

Examples of suitable aliphatic dimethylenes include ethylene, propylene, methylpropylene, tetramethylene, pentamethylene, hexamethylene, neopentylene [—$CH_2C(CH_3)_2$—$CH_2$], 1,4-cyclohexane-dimethylene, 1,3-cyclohexane-dimethylene, 1,3-cyclopentane-dimethylene, norbornane-dimethylene, —$CH_2CH_2(OCH_2CH_2)$—, where n is an integer with 1 to 5 being preferred, and mixtures thereof.

According to a twenty-first embodiment of the non-transparent microvoided biaxially stretched self-supporting non-laminated polymeric film, according to the present invention, the aliphatic dimethylene monomer units are selected from the group consisting of ethylene, diethylene ether, tetramethylene, neopentylene, 2-endo, 3-endo norbornane dimethylene and 1,4-cyclohexane-dimethylene.

According to a twenty-second embodiment of the non-transparent microvoided biaxially stretched self-supporting non-laminated polymeric film, according to the present invention, at least 1 mole % of the aliphatic dimethylene monomer units in the linear polyester are neopentylene or 1,4-cyclohexanedimethylene monomer units, with at least 3 mole % being preferred and at least 5 mole % being particularly preferred.

According to a twenty-third embodiment of the non-transparent microvoided biaxially stretched self-supporting non-laminated polymeric film, according to the present invention, 30 mole % or less of the aliphatic dimethylene monomer units in the linear polyester are neopentylene or 1,4-cyclohexanedimethylene monomer units, with 20 mole % or less being preferred, 18 mole % or less being particularly preferred and 15% or less being especially preferred.

According to a twenty-fourth embodiment of the non-transparent microvoided biaxially stretched self-supporting non-laminated polymeric film, according to the present invention, the linear polyester comprises at least one linear aromatic polyester resin. Upon heating, e.g. during mixing in an extruder, the different linear aromatic polyester resins present will undergo metathesis, condensing and decondensing so as to evolve upon sufficiently long heating into a single resin.

Such polyesters are well known in the art and may be produced by well-known techniques, for example, those described in U.S. Pat. No. 2,465,319 and U.S. Pat. No. 2,901,466.

According to a twenty-fifth embodiment of the non-transparent microvoided biaxially stretched self-supporting non-laminated polymeric film, according to the present invention, the polymeric film further contains an electroconductivity enhancing additive e.g. a metallic salt which ionizes in the melt giving enhanced electroconductivity such as magnesium acetate, manganese salts and cobalt sulphate. Suitable salt concentrations are about $3.5 \times 10^{-4}$ moles/mole polyester. Enhanced polyester melt viscosity enables improved pinning of the melt on the chilling roller maintained at a temperature of 5 to 25° C. (preferably 15 to 30° C.) to cool the extrudate thereby enabling higher stretching forces to be realized and hence enhanced void-forming and a higher degree of opacification.

According to a twenty-sixth embodiment of the non-transparent microvoided biaxially stretched self-supporting non-laminated polymeric film, according to the present invention, the linear polyester is a polymer having aromatic dicarboxylate monomer units selected from the group consisting of terephthalate, isophthalate and naphthalene dicarboxylates and aliphatic dimethylene monomer units selected from the group consisting of ethylene, tetramethylene, neopentylene and 1,4-cyclohexanedimethylene.

Poly(ethylene terephthalate), which may be modified by small amounts of other monomers, is especially preferred. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. No. 4,420,607, U.S. Pat. No. 4,459,402 and U.S. Pat. No. 4,468,510.

The linear polyester utilized in the present invention should have a glass transition temperature from 40° C. to 150° C., preferably from 50 to 120° C. and should be orientable.

According to a twenty-seventh embodiment of the non-transparent microvoided biaxially stretched self-supporting non-laminated polymeric film, according to the present invention, the linear polyester has an inherent viscosity determined in a 0.5 g/dL solution of 60 wt % phenol and 40 wt % ortho-dichlorobenzene at 25° C. of at least 0.45 dl/g with an inherent viscosity of 0.48 to 0.9 dl/g being preferred and an inherent viscosity of 0.5 to 0.8 dl/g being particularly preferred.

Examples of a suitable continuous phase include a blend comprising poly(ethylene terephthalate) and poly(1,4-cyclohexylene dimethylene terephthalate) and a blend comprising poly(ethylene terephthalate) and poly(neopentylene terephthalate).

Amorphous High Polymer

The amorphous high polymer used in the polymeric film, used in the present invention, has a glass transition temperature higher than the glass transition temperature of the continuous phase in which it is dispersed e.g. a linear polyester. Poly(ethylene terephthalate), for example, has a glass transition temperature of ca. 80° C.

The glass transition temperatures and refractive indices for various amorphous high polymers are given in the table below:

|  | $T_g$ [° C.] | Refractive index for sodium line at 589.3 nm [ASTM D642] |
|---|---|---|
| polystyrene | 100 | 1.57-1.60 |
| poly-α-methyl-styrene | 168 | 1.610 |
| poly-4-methyl-styrene | 93 | — |
| poly-α-vinyl-naphthalene | 159 | 1.6818 |
| polyacrylonitrile | 85 | 1.514, 1.5187 |
| polymethacrylonitrile | 120 | 1.520 |
| polymethyl methacrylate | 105 | 1.49, 1.4893 |
| polyacrylamide | 165 | — |
| copolymer of acrylonitrile and styrene | 112 | 1.56-1.57, 1.57 |
| copolymer of 28.5 wt % acrylonitrile and 71.5 wt % styrene | 108 | 1.56-1.57, 1.57 |
| ABS | 110 | 1.53-1.54 |

According to a twenty-eighth embodiment of the non-transparent microvoided biaxially stretched self-supporting non-laminated polymeric film, according to the present invention, the uniformly dispersed amorphous high polymer is crosslinked or non-crosslinked.

According to a twenty-ninth embodiment of the non-transparent microvoided biaxially stretched self-supporting non-laminated polymeric film, according to the present invention, the amorphous high polymer comprising the at least one chain-polymerized block is selected from the group consisting of polystyrene, styrene copolymers, SAN-polymers, polyacrylates, acrylate-copolymers, polymethacrylates and methacrylate-copolymers.

According to a thirtieth embodiment of the non-transparent microvoided biaxially stretched self-supporting non-laminated polymeric film, according to the present invention, the amorphous high polymer comprising at least one chain-polymerized block is a styrene copolymer block selected from the group consisting of SAN-polymers, ABS-polymers and SBS-polymers.

According to a thirty-first embodiment of the non-transparent microvoided biaxially stretched self-supporting non-laminated polymeric film, according to the present invention, the amorphous high polymer comprising at least one chain-polymerized block is a SAN-polymer, wherein the concentration of AN-monomer units in the SAN-polymer is 15 to 35% by weight.

According to a thirty-second embodiment of the non-transparent microvoided biaxially stretched self-supporting non-laminated polymeric film, according to the present invention, the amorphous high polymer comprising at least one chain-polymerized block the amorphous high polymer is a SAN-polymer and the weight ratio of the linear polyester to the SAN-polymer is in the range of 3.5:1 to 15.0:1, with 4.0:1 to 11.0:1 being preferred.

According to a thirty-third embodiment of the non-transparent microvoided biaxially stretched self-supporting non-laminated polymeric film, according to the present invention, the amorphous high polymer is exclusive of a cellulose ester.

According to a thirty-fourth embodiment of the non-transparent microvoided biaxially stretched self-supporting non-laminated polymeric film, according to the present invention, the amorphous high polymer comprising at least one chain-polymerized block is at least partially crosslinked e.g. at least partially crosslinked poly(methyl methacrylate) or at least partially crosslinked copolymers of acrylonitrile and styrene.

According to a thirty-fifth embodiment of the non-transparent microvoided biaxially stretched self-supporting non-laminated polymeric film, according to the present invention, the film has a linear polyester as continuous phase and dispersed therein is an amorphous high polymer comprising at least one chain-polymerized block having a degree of crosslinking of at least 10%.

According to a thirty-sixth embodiment of the non-transparent microvoided biaxially stretched self-supporting non-laminated polymeric film, according to the present invention, the amorphous high polymer comprising at least one chain-polymerized block is a SAN polymer, the SAN polymer concentration being preferably at least 5% by weight of the film, with at least 10% by weight of the film being particularly preferred.

The SAN polymer additive of the present composition is a known class of polymer consisting essentially of a random copolymer of a styrenic monomer component, including styrene as well as an alpha-lower alkyl-substituted styrene or mixtures thereof and an acrylonitrilic monomer component including acrylonitrile as well as an alpha-lower alkyl substituted acrylonitrile or mixtures thereof. By lower-alkyl is meant a straight or branched chain alkyl group of 1 to 4 carbon atoms exemplified by the methyl, ethyl, isopropyl and t-butyl groups. In readily available SAN polymers, the styrene component is generally styrene, alpha-straight chain alkyl substituted styrene, typically alpha-methyl-styrene, or mixtures hereof with styrene being preferred. Similarly in the readily available SAN polymers, the acrylonitrile component is generally acrylonitrile, alpha-methyl-acrylonitrile or mixtures thereof with acrylonitrile being preferred.

In the SAN polymer the styrene component is present in a major weight proportion, i.e. in a weight proportion of greater than 50%, typically about 65% to about 90%, especially about 70% to about 80%, based on the combined weight of the styrene component and the acrylonitrile component. The acrylonitrile component is present in a minor proportion, i.e. in a weight proportion of less than 50%, typically about 10% to about 35% especially about 20% to 30% based on the combined weight of the styrene monomer component and the acrylonitrile monomer component. Styrene-acrylonitrile copolymers are currently commercially available with an acrylonitrile content of 15 to 35% by weight, with 18 to 32% by weight being preferred and 21 to 30% by weight being particularly preferred.

According to a thirty-seventh embodiment of the non-transparent microvoided biaxially stretched self-supporting non-laminated polymeric film, according to the present invention, the amorphous high polymer comprising at least one chain-polymerized block is a SAN polymer in which the concentration of AN-monomer units is 15 to 35% by weight.

The SAN polymer class is more particularly identified and described in R. E. Gallagher, U.S. Pat. No. 3,988,393, issued Oct. 26, 1976 (especially at Column 9, lines 14-16 and in claim 8), in "Whittington's Dictionary of Plastics", Technomic Publishing Co., First Edition, 1968, page 231, under the section headed "Styrene-Acrylonitrile Copolymers (SAN)", and R. B. Seymour, "Introduction to Polymer Chemistry", McGraw-Hill, Inc., 1971, page 200, (last two lines) to page 201 (first line). The preparation of a SAN polymer by copolymerization of styrene and acrylonitrile is more particularly described in the "Encyclopedia of Polymer Science and Technology", John Wiley and Sons, Inc., Vol. 1, 1964, pages 425-435.

According to a thirty-eighth embodiment of the non-transparent microvoided biaxially stretched self-supporting non-laminated polymeric film, according to the present invention, the amorphous high polymer comprising at least one chain-polymerized block is a non-crosslinked SAN polymer having a number average molecular weight in the range of 30,000 to 100,000, preferably in the range of 40,000 to 80,000. Typical SAN-polymers have number averaged molecular weights of 45,000 to 60,000 and polymer dispersities ($M_w/M_n$) of 1.2 to 2.5.

According to a thirty-ninth embodiment of the non-transparent microvoided biaxially stretched self-supporting non-laminated polymeric film, according to the present invention, the amorphous high polymer comprising at least one chain-polymerized block is a non-crosslinked SAN polymer having a weight average molecular weight in the range of 50,000 to 200,000, preferably in the range of 75,000 to 150,000. The higher the molecular weight of the SAN polymer, the larger the size of the dispersed SAN polymer particles.

Inorganic Opacifying Pigment

According to a fortieth embodiment of the non-transparent microvoided biaxially stretched self-supporting non-laminated polymeric film, according to the present invention, the polymeric film further comprises at least one inorganic opacifying pigment, the inorganic opacifying pigment being preferably selected from the group consisting of silica, zinc oxide, zinc sulphide, lithopone, barium sulphate, calcium carbonate, titanium dioxide, aluminium phosphate and clays. The titanium dioxide may have an anatase or rutile morphology and may be stabilized by alumina oxide and/or silicon dioxide. The aluminium phosphate can be an amorphous hollow pigment e.g. the Biphor™ pigments from BUNGE.

The refractive indices of these pigments is given in the table below:

| inorganic opacifying pigment | refractive index for sodium line at 589.3 nm |
| --- | --- |
| kaolinite | 1.53-1.57 |
| bentonite | 1.557 |
| china clay | 1.56 |
| silica—silica gel | 1.55 |
| silica—cristobalite | 1.487, 1.484 |
| silica—quartz | 1.544, 1.553 |
| calcium carbonate | 1.59, 1.6, 1.58 |
| calcium carbonate—calcite | 1.486, 1.64-1.66 |
| barium sulphate—baryte | 1.637, 1.638, 1.649, 1.64 |
| Lithopone 30% (zinc sulphide/barium sulphate) | 1.84 |
| zinc oxide (ultrafine) | 1.9 |
| zinc oxide (zincite) | 2.008, 2.029 |
| zinc sulphide | 2.37 |
| titanium dioxide—anatase | 2.554, 2.493, 2.55 |
| titanium dioxide—rutile | 2.616, 2.903, 2.76 |

According to a forty-first embodiment of the non-transparent microvoided biaxially stretched self-supporting non-laminated polymeric film, according to the present invention, the film comprises ≦5% by weight of inorganic opacifying pigment i.e. the total quantity of inorganic opacifying pigment present regardless of type is ≦5% by weight, with ≦3% by weight of inorganic opacifying pigment being preferred.

According to a forty-second embodiment of the non-transparent microvoided biaxially stretched self-supporting non-laminated polymeric film, according to the present invention, the film further comprises an inorganic opacifying pigment having a number averaged particle size between 0.1 and 10 μm, with 0.2 to 2 μm being preferred.

Addition of an inorganic opacifying pigment has the advantage of stabilizing the orientation of the polyester, so that the non-transparent microvoided biaxially stretched self-supporting film can be stabilized at temperatures of 175° C. without substantially affecting the opacity of the non-transparent microvoided biaxially stretched self-supporting film. Without the presence of an inorganic opacifying pigment, such as $BaSO_4$ or $TiO_2$, thermofixing of the polyester is possible, but only at the expense of some of the opacity of the non-transparent microvoided biaxially stretched self-supporting film. Moreover, pigments with a refractive index below 2.0 do not of themselves provide substantial opacity due to the small refractive index differences between the pigment and the polymer matrix.

Titanium dioxide particles dispersed in polymer films have been found not to induce microvoiding upon stretching the films.

Whitening Agent

According to a forty-second embodiment of the non-transparent microvoided biaxially stretched self-supporting non-laminated polymeric film, according to the present invention, the film further contains a whitening agent, a concentration ≦0.5% by weight being preferred, a concentration of ≦0.1% by weight being particularly preferred, a concentration of ≦0.05% by weight being especially preferred and a concentration of ≦0.035% by weight being especially preferred.

According to a forty-third embodiment of the non-transparent microvoided biaxially stretched self-supporting non-laminated polymeric film, according to the present invention, the film further comprises a whitening agent selected from the group consisting of bis-benzoxazoles e.g. bis-benzoxazolyl-stilbenes and bis-benzoxazolyl-thiophenes; benzotriazole-phenylcoumarins; naphthotriazole-phenylcoumarins; triazine-phenylcoumarins and bis(styryl)biphenyls.

Suitable whitening agents are:

| | | |
| --- | --- | --- |
| UVITEX ® OB | | CIBA |
| UVITEX ® OB-ONE | | CIBA |
| Eastobrite OB | 2,5-thiophenediylbis(5-tert-butyl-1,3-benzoxazole) bis-benzoxazolyl-stilbene bis-benzoxazolyl-thiophene | Eastman Chemical |

Flame Retardant

According to a forty-fourth embodiment of the non-transparent microvoided biaxially stretched self-supporting non-laminated polymeric film, according to the present invention, the film further comprises a flame retardant.

According to a forty-fifth embodiment of the non-transparent microvoided biaxially stretched self-supporting non-laminated polymeric film, according to the present invention, the film further comprises a flame retardant selected from the group consisting of: brominated compounds; organophosphorus compounds; melamine; melamine-derivatives, e.g. melamine salts with organic or inorganic acids such as boric acid, cyanuric acid, phosphoric acid or pyro/poly-phosphoric acid, and melamine homologues such as melam, melem and melon; metal hydroxides e.g. aluminium hydroxide and magnesium hydroxide; ammonium polyphosphates and zinc borate e.g. with a composition of $xZnO.yB_2O_3.zH_2O$ such as $2ZnO.3B_2O_3.3.5H_2O$.

Suitable flame retardants include:

| | | |
|---|---|---|
| SAYTEX ® HP-7010 P/G | brominated polystyrene | Albemarle Corporation |
| SAYTEX ® HP-3010 | brominated polystyrene | Albemarle Corporation |
| SAYTEX ® 8010 | ethane-1,2-bis(pentabromo-phenyl) | Albemarle Corporation |
| SAYTEX ® BT-93 | ethylene bis-tetrabromo-phthalimide | Albemarle Corporation |
| SAYTEX ® BT-93W | Ethylene bis-tetrabromo-phthalimide | Albemarle Corporation |
| SAYTEX ® CP-2000 | brominated compound | Albemarle Corporation |
| SAYTEX ® 120 | tetradecabromo-diphenoxy benzene | Albemarle Corporation |
| SAYTEX ® 102E | Decabromodiphenyl oxide | Albemarle Corporation |
| SAYTEX ® 9006L | brominated compound | Albemarle Corporation |
| SAYTEX ® HP-900 | brominated compound | Albemarle Corporation |
| SAYTEX ® HP-800A | brominated compound | Albemarle Corporation |
| SAYTEX ® HP-800AG | brominated compound | Albemarle Corporation |
| SAYTEX ® BC70HS | brominated compound | Albemarle Corporation |
| NcendX P-30 | organophosphorus compound | Albemarle Corporation |
| MARTINAL ® OL-104 | aluminium hydroxide | Albemarle Corporation |
| MARTINAL ® OL-104/LE | aluminium hydroxide | Albemarle Corporation |
| MARTINAL ® OL-104/WE | aluminium hydroxide | Albemarle Corporation |
| MARTINAL ® OL-104/LFF | aluminium hydroxide | Albemarle Corporation |
| MARTINAL ® OL-104/LCD | aluminium hydroxide | Albemarle Corporation |
| MARTINAL ® OL-107 | aluminium hydroxide | Albemarle Corporation |
| MARTINAL ® OL-107/LE | aluminium hydroxide | Albemarle Corporation |
| MARTINAL ® OL-107/LFF | aluminium hydroxide | Albemarle Corporation |
| MARTINAL ® OL-107/LCD | aluminium hydroxide | Albemarle Corporation |
| MARTINAL ® OL/Q-107 | aluminium hydroxide | Albemarle Corporation |
| MARTINAL ® OL-111/LE | aluminium hydroxide | Albemarle Corporation |
| MAGNIFIN ® H3 | magnesium hydroxide | Albemarle Corporation |
| MAGNIFIN ® H5 | magnesium hydroxide | Albemarle Corporation |
| MAGNIFIN ® H7 | magnesium hydroxide | Albemarle Corporation |
| MAGNIFIN ® H10 | magnesium hydroxide | Albemarle Corporation |
| MAGNIFIN ® T2C | magnesium hydroxide | Albemarle Corporation |
| MAGNIFIN ® T3C | magnesium hydroxide | Albemarle Corporation |
| MELAPUR ® MCXL | melamine cyanurate | CIBA |
| MELAPUR ® MC50 | melamine cyanurate | CIBA |
| MELAPUR ® MC25 | melamine cyanurate | CIBA |
| MELAPUR ® 200 70 | melamine polyphosphate | CIBA |
| MELAPUR ® MP | melamine phosphate | CIBA |
| FIREBRAKE ® ZB | a zinc borate compound | LUZENAC |
| FIREMASTER ® PBS-64 | brominated styrene-based technology | GREAT LAKES CHEMICAL CORP. |
| FIREMASTER ® PBS-64HW | brominated styrene-based technology | GREAT LAKES CHEMICAL CORP. |
| FIREMASTER ® CP-44B | copolymer of brominated styrene & glycidyl methacrylate | GREAT LAKES CHEMICAL CORP. |

Antioxidant

According to a forty-sixth embodiment of the non-transparent microvoided biaxially stretched self-supporting non-laminated polymeric film, according to the present invention, the film further comprises an antioxidant.

According to a forty-seventh embodiment of the non-transparent microvoided biaxially stretched self-supporting non-laminated polymeric film, according to the present invention, the film further comprises an antioxidant selected for the group consisting of organotin derivatives, sterically hindered phenols, sterically hindered phenol derivatives and phosphites.

Suitable flame retardants include:

| | | |
|---|---|---|
| ETHANOX ® 310 | Organotin catalyzed penta-erythritol tetrakis (3-(3,5-di-t-butyl-4-hydroxyphenyl)-propionate) | Albemarle Corporation |
| ETHANOX ® 310TF | "Tin-free" pentaerythritol tetrakis (3-(3,5-di-t-butyl-4-hydroxyphenyl)propionate) | Albemarle Corporation |
| ETHANOX ® 314 | 1,3,5-tris(3,5-di-tert-butyl-4-hydroxybenzyl)-1,3,5-tria-zine-2,4,6(1h,3h,5h)-trione | Albemarle Corporation |
| ETHANOX ® 330 | 1,3,5-trimethyl-2,4,6-tris (3,5-di-tert-butyl-4-hydroxy-benzyl) benzene | Albemarle Corporation |
| ETHANOX ® 376 | octadecyl-3-(3,5-di-t-butyl-4-hydroxyphenyl)-propionate | Albemarle Corporation |
| ETHAPHOS ™ 368 | tris-(2,4-di-t-butylphenyl) phosphite | Albemarle Corporation |

| | | |
|---|---|---|
| ETHAPHOS ™ 326 | Bis (2,4-di-t-butylphenyl) pentaerythritol diphosphite | Albemarle Corporation |
| IRGANOX ® 259 | | CIBA |
| IRGANOX ® 1010 | | CIBA |
| IRGANOX ® 1425 | | CIBA |
| IRGANOX ® B 900 | | CIBA |
| HOSTANOX ® O 3 | Bis[3,3'-bis-(4'-hydroxy-3'-tert-butyl-phenyl)butanoic acid]glycol ester | CLARIANT |
| HOSTANOX ® O 10 | tetrakis[methylene(3,5-di-t-butyl-4-hydroxy-benzyl)isocyanurate | CLARIANT |
| HOSTANOX ® O 310 | 1/1 mixture of HOSTANOX ® O 10 & HOSTANOX ® O 3 | CLARIANT |
| HOSTANOX ® 245 | ethylene bis(oxyethylene)bis-[3-(5-t-butyl-4-hydroxy-m-tolyl)-propionate] | CLARIANT |

Light Stabilizers

According to a forty-eighth embodiment of the non-transparent microvoided biaxially stretched self-supporting non-laminated polymeric film, according to the present invention, the film further comprises a light stabilizer.

According to a forty-ninth embodiment of the non-transparent microvoided biaxially stretched self-supporting non-laminated polymeric film, according to the present invention, the film further comprises a hindered amine light stabilizer.

Suitable light stabilizers include:

| | | |
|---|---|---|
| LS-01 | CHIMASSORB 119 | CIBA |
| LS-02 | CHIMASSORB 944 | CIBA |
| LS-03 | TINUVIN ® 123 | CIBA |
| LS-04 | TINUVIN ® 144 | CIBA |
| LS-05 | TINUVIN ® 622 | CIBA |
| LS-06 | TINUVIN ® 765 | CIBA |
| LS-07 | TINUVIN ® 770 | CIBA |
| LS-08 | TINUVIN ® 783 | CIBA |
| LS-09 | TINUVIN ® 791 | CIBA |
| LS-10 | TINUVIN ® B 75 | CIBA |
| LS-11 | TINUVIN ® B 241 | CIBA |

UV-Absorbers

According to a fiftieth embodiment of the non-transparent microvoided biaxially stretched self-supporting non-laminated polymeric film, according to the present invention, the film further comprises a UV-absorber.

According to a fifty-first embodiment of the non-transparent microvoided biaxially stretched self-supporting non-laminated polymeric film, according to the present invention, the film further comprises an UV-absorber selected from the group consisting of benzotriazole derivatives and triazine derivatives.

Suitable UV-absorbers include:

Image Recording Element

Aspects of the present invention are also realized by an image recording element comprising non-transparent microvoided biaxially stretched self-supporting non-laminated polymeric film, according to the present invention.

According to a first embodiment of the image recording element, according to the present invention, the image recording element is a photographic paper for producing photographic prints.

According to a second embodiment of the image recording element, according to the present invention, the image recording element is an overprintable paper.

According to a third embodiment of the image recording element, according to the present invention, the film is provided on at least one side with an overprintable layer i.e. for impact and non-impact printing.

According to a fourth embodiment of the image recording element, according to the present invention, the film is provided on at least one side with a transparent overprintable layer i.e. for impact and non-impact printing.

According to a fifth embodiment of the image recording element, according to the present invention, the film is provided on at least one side with a non-transparent overprintable layer i.e. suitable for at least one impact and non-impact print technique.

According to a sixth embodiment of the image recording element, according to the present invention, the film is provided on at least one side with a non-transparent transparentizable overprintable layer i.e. i.e. suitable for at least one impact and non-impact print technique.

According to a seventh embodiment of the image recording element, according to the present invention, the film is provided on at least one side with an ink-jet receiving layer. Typical receiving layers are either porous in the case of aqueous or solvent inks or pastes to enable rapid drying to the touch or are non-porous in the case of phase-change inks or

| | | | |
|---|---|---|---|
| UV-01 | CHIMASSORB | | CIBA |
| UV-02 | TINUVIN ® 213 | | CIBA |
| UV-03 | TINUVIN ® 234 | | CIBA |
| UV-04 | TINUVIN ® 327 | | CIBA |
| UV-05 | TINUVIN ® 360 | | CIBA |
| UV-06 | TINUVIN ® 1577 | | CIBA |
| UV-07 | HOSTAVIN ® PR-25 | propanedioic acid, [(4-methoxy-phenyl)-methylene]-, dimethyl ester | CLARIANT |
| UV-08 | SANDUVOR ® VSU | 2-ethyl-2'-ethoxy-oxalanilide | CLARTANT |
| UV-09 | HOSTAVIN ® B-CAP | tetra-ethyl-2,2'-(1,4-phenylene-dimethylidene)-bismalonate | CLARIANT |
| UV-10 | HOSTAVIN ® ARO 8 | 2-hydroxy-4-n-octyloxybenzophenone | CLARIANT | curable inks e.g. radiation curable inks. Porous receiving layers typically comprise at least one pigment such as silica or alumina; at least one binder, such as an ammonium salt of a styrene-acrylate-acrylic acid terpolymer; a surfactant e.g. an anionic surfactant such as an aliphatic sulphonate; optionally a levelling agent, such as polydimethylsiloxane, and optionally a mordant.

According to an eighth embodiment of the image recording element, according to the present invention, the film is provided on at least one side with an imaging layer e.g. a photographic layer e.g. a silver halide emulsion layer; a photothermographic element and a substantially light-insensitive thermographic element; and the dye receiver layer of a dye thermal transfer system.

According to a ninth embodiment of the image recording element, according to the present invention, the film is provided on at least one side with a writable layer e.g. with a pencil, ball-point pen and fountain pen.

Process for Producing a Transparent Pattern

Aspects of the present invention have been realized by a process for producing a transparent pattern comprising the step of: image-wise application of heat optionally supplemented by the application of pressure to a non-transparent microvoided biaxially stretched self-supporting non-laminated polymeric film according to the present invention.

According to a first embodiment of the process for producing a transparent pattern, according to the present invention, the image-wise applied heat is provided by a digital or an analogue process.

According to a second embodiment of the process for producing a transparent pattern, according to the present invention, the image-wise applied heat is provided by a digital process using a laser beam or a thermal head.

According to a third embodiment of the process for producing a transparent pattern, according to the present invention, the image-wise applied heat is provided by an analogue process using a heated stamp or an infrared image.

According to a fourth embodiment of the process for producing a transparent pattern, the heat is applied by a heated or hot stamp, a thermal head, a heated or hot bar or a laser. The heating can be carried out from one or both sides of the film. Optical density changes of at least 0.4 can be readily realized or up to 40% without significant changes in film thickness. Moreover, the transparentization effect realized by the process for obtaining a transparent pattern, according to the present invention, results from a combination of heat supplied by a heat source, the pressure between the heat source and the film and the time the heat source is applied. The heat has to be applied for at least 1 ms either continuously or non-continuously. Heating with a thermal head can be with a single heat pulse, but multiple short heating pulses are preferred to avoid overheating of the heating elements. When a thermal head is used a foil can be used between the thermal head and the non-transparent microvoided biaxially stretched self-supporting film during the heating process e.g. a 6 μm thick PET-film can be interposed between the non-transparent microvoided film and the thermal head to prevent possible contamination of the thermal head. Thermal head printers, such as the DRYSTAR-printers supplied by AGFA-GEVAERT N.V., can be used produce the transparent pattern of the present invention e.g. as personalized watermarks.

This transparentization effect is accompanied by a relief pattern, which can be detected by touch i.e. in a tactile manner, and by changes in glossiness. This relief pattern is more pronounced the higher the temperature of the heat source e.g. in the case of A SAN-polymer as dispersed phase this embossing effect increasing with temperature between 110° C. and 190° C. The tactile relief obtained by applying a hot stamp to a non-transparent microvoided biaxially stretched self-supporting film is much more pronounced than that obtained using a thermal head.

The degree of transparency realized depends upon the stamp/thermal head printing conditions: time, temperature and pressure. The thermofixation history of the material is also important. The heated-induced transparentization of the non-transparent microvoided biaxially stretched self-supporting film can be carried out before or after the optional application of a layer, such as an ink-jet receiving layer and before or after transparentization. The relative positioning of the transparentized areas and transparency in the support can be of value as an additional security measure.

According to a fifth embodiment of the process for producing a transparent pattern, according to the present invention, the heat is applied non-continuously.

According to a sixth embodiment of the process for producing a transparent pattern, according to the present invention, a transparent overprintable layer is provided on the film prior to the image-wise application of heat.

According to a seventh embodiment of the process for producing a transparent pattern, according to the present invention, a transparent overprintable layer is provided on the film after the image-wise application of heat.

INDUSTRIAL APPLICATION

Non-transparent microvoided biaxially stretched films, according to the present invention, can be used as synthetic paper for printing and other applications, as a relector in LCD displays and photovoltaic devices, as a support for imaging materials e.g. impact and non-impact (e.g. electrophotography, electrography and ink jet) receiving materials, photothermographic recording materials, substantially light-insensitive thermographic recording materials, dye sublimation printing, thermal transfer printing, etc., in security and anti-counterfeiting applications e.g. in tickets, labels, tags, an ID-card, a bank card, a legal document, banknotes and packaging and can also be integrated into packaging.

Non-transparent microvoided biaxially stretched films, according to the present invention, can be used as a thermal, sound or electrical insulator e.g. as an electrical insulator in capacitors.

The invention is illustrated hereinafter by way of comparative examples and examples. The percentages and ratios given in these examples are by weight unless otherwise indicated.

Subbing layer Nr. 01 on the emulsion side of the support:

| | |
|---|---|
| copolymer of 88% vinylidene chloride, 10% methyl acrylate and 2% itaconic acid | 79.1 mg/m$^2$ |
| Kieselsol ® 100F, a colloidal silica from BAYER | 18.6 mg/m$^2$ |
| Mersolat ® H, a surfactant from BAYER | 0.4 mg/m$^2$ |
| Ultravon ® W, a surfactant from CIBA-GEIGY | 1.9 mg/m$^2$ |

Ingredients used in the EXAMPLES:
Polyester:

| PET-nr | | | MFI 270° C./ 1.20 kg [cm³/10 min] | Inherent viscosity** [η] [dl/g] | $T_g$ [° C.] |
|---|---|---|---|---|---|
| 01 | T03* | polyethylene terephthalate | 34.8 | 0.60 | 80.5 |
| 02 | T04* | polyethylene terephthalate | 34.8 | 0.60 | 80.5 |
| 03 | WP75# | polyester of 98.5 mol % terephthalate, 1.5 mol % isophthalate and 100 mol % ethylene units | | 0.77 | 80 |
| 04 | DP9990# | polyester of 90 mol % terephthalate, 10 mol % isophthalate and 100 mol % ethylene units | | 0.60 | |
| 05 | DP9970# | polyester of 70 mol % terephthalate, 30 mol % isophthalate and 100 mol % ethylene units | | | |

*AGFA-GEVAERT N.V.
La Seda
**inherent viscosity was determined in a 0.5 g/dL solution of 60 wt % phenol and 40 wt % ortho-dichlorobenzene at 25° C. in an Ubbelohde viscometer Styrene-Acrylonitrile Copolymers:

| SAN-nr | | Wt % acrylonitrile | Wt % styrene | MFI at 270° C./1.20 kg [mL/10 min] | Mn | Mw | $T_g$ [° C.] |
|---|---|---|---|---|---|---|---|
| 01 | TYRIL 905* | 20 | 80 | 7.1 | | | 105.2 |
| 02 | TYRIL 867E* | 25 | 75 | 5.8 | | | 106.5 |
| 03 | SAN 140* | 27.5 | 72.5 | 53.2 | 47,640 | 99,820 | 108.8 |
| 04 | LURAN 368R# | 28 | 72 | 3.9 | | | 107.3 |
| 05 | TYRIL 790* | 29 | 71 | 12.1 | | | 106.3 |
| 06 | SAN 124* | 28.5 | 71.5 | 37.9 | 53,940 | 109,350 | 108.1 |
| 07 | LURAN 388S# | 33 | 67 | 3.6 | | | 108.7 |

*DOW CHEMICAL
BASF
MFI = Melt Flow Index

TPX DX820: a high rigidity isotactic poly(4-methyl-1-pentene) from MITSUI CHEMICAL
TITANIUM DIOXIDE: Renol-white/PTX 506, a masterbatch from CLARIANT GmbH containing 65% by weight $TiO_2$ and 35 wt % polyester Comparative Examples 1 to 3

The PET-types and SAN-types used for producing the extrudates used in producing of the films of COMPARATIVE EXAMPLES 1 to 3 are given in Table 1. The PET, SAN, $TiO_2$ and UVITEX OB-one in the weight percentages given in Table 3 were mixed and then dried at 150° C. for 4 hours under vacuum (<100 mbar), the mixtures then melted in a PET-extruder and extruded through a sheet die and cooled to produce the extrudates of COMPARATIVE EXAMPLES 1 to 3.

TABLE 1

| Comparative Example nr | PET01 [wt %] | PET02 [wt %] | PET03 [wt %] | SAN type | $TiO_2$ [wt %] | OB-one [ppm] |
|---|---|---|---|---|---|---|
| C1 | 98 | — | — | — | 2 | 150 |
| C2 | 47 | — | 47 | — | 6 | — |
| C3 | 44 | — | 44 | — | 12 | — |

The extrudates of COMPARATIVE EXAMPLES 1 to 3 were then longitudinally stretched with an INSTRON apparatus in which the extrudates are heated in an oven mounted on the apparatus under the conditions given in Table 2.

TABLE 2

| Comparative Example nr. | Stretch ratio | Stretch force [N/mm²] | Thickness [μm] | OD TR924 |
|---|---|---|---|---|
| C1/LS1 | 3.3 | 6.0 | 319 | 0.81 |
| C2/LS1 | 3.3 | 5.0 | 340 | 1.26 |
| C3/LS1 | 3.3 | 5.0 | 335 | 1.59 |

Transversal stretching was then performed on the longitudinally stretched films with a stretch time of 30 s and stretching speed of 1000%/min under the conditions given in Table 3. Finally the films were thermally fixated at 175° C. for 1 minute giving the substantially opaque films of COMPARATIVE EXAMPLES 1/LS1, 2/LS2 and 3/LS3.

The optical densities of the films of COMPARATIVE EXAMPLES 1/LS1/BS1, 2/LS1/BS1 and 3/LS1/BS1 were measured in transmission mode with a MACBETH TR924 densitometer with a visible filter and the results given in Table 3.

TABLE 3

| Comparative Example nr. | Stretch ratio | Stretch temperature [° C.] | Thickness [μm] | OD (TR924) after thermal fixation |
|---|---|---|---|---|
| C1/LS1/BS1 | 3.3 | 135 | 120 | 0.45 |
| C2/LS1/BS1 | 3.3 | 135 | 140 | 0.90 |
| C3/LS1/BS1 | 3.3 | 135 | 135 | 1.12 |

*the higher the stretching tension the lower the stretch temperature

The films of COMPARATIVE EXAMPLES 1/LS/BS, 2/LS/BS and 3/LS/BS were each mounted in an Instron 4411 apparatus and were heated at various temperatures between 120 and 190° C. for 5 seconds with a soldering iron in the upper clamp making contact with the film at a pressure of 0.5 N/mm$^2$. The optical densities of the film after the tests were measured in transmission with a MacBeth TR924 densitometer with a visible filter and the film thicknesses were also measured. The results are summarized below in Tables 4 and 5 respectively.

TABLE 4

| Film of Comparative Example nr | OD before heating | OD after heating for 5 s at a pressure of 0.5 N/mm$^2$ at | | | | | ΔOD at 150° C. | % reduction in OD |
|---|---|---|---|---|---|---|---|---|
| | | 120° C. | 130° C. | 150° C. | 170° C. | 190° C. | | |
| C1/LS/BS | 0.45 | 0.47 | 0.46 | 0.46 | 0.47 | 0.45 | −0.01 | −0.01 |
| C2/LS/BS | 0.90 | 0.90 | 0.91 | 0.89 | 0.88 | 0.85 | 0.01 | 0.01 |
| C3/LS/BS | 1.12 | 1.14 | 1.14 | 1.11 | 1.11 | 1.08 | 0.01 | 0.01 |

TABLE 5

| Film of Comparative Example nr | Layer thickness before heating | Layer thickness after heating for 5 s at a pressure of 0.5 N/mm$^2$ at | | | | |
|---|---|---|---|---|---|---|
| | | 120° C. | 130° C. | 150° C. | 170° C. | 190° C. |
| C1/LS/BS | 93 | 92 | 91 | 93 | 92 | 85 |
| C2/LS/BS | 138 | 139 | 142 | 137 | 132 | 115 |
| C3/LS/BS | 137 | 136 | 135 | 139 | 131 | 119 |

Within experimental error no transparentization was observed upon heating the films of COMPARATIVE EXAMPLES 1/LS/BS, 2/LS/BS and 3/LS/BS. This shows that in the absence of dispersed SAN-polymer particles there is no transparentization of films containing titanium dioxide i.e. there is no micro-void formation.

Comparative Example 4

The 1083 μm thick extrudate of COMPARATIVE EXAMPLE 4 with a composition of 2% by weight of titanium dioxide, 100 ppm UVITEX OB-one and 98% by weight of PET02 was produced as described for EXAMPLES 1 to 58 and had an optical density measured with a MacBeth TR924 densitometer in transmission mode with a visible filter of 1.35. The extrudate was stretched in the length direction as described in COMPARATIVE EXAMPLES 1 to 3 under the conditions given in Table 6. The thickness values were measured by averaging measurements obtained by contacting the upper surface at 16 different positions at a measuring force of 0.8 N using a SONY U30A thickness gauge with a resolution of 1 μm, an accuracy of 2 μm and a contact ball 3 mm in diameter.

TABLE 6

| Comparative Example nr. | Stretch ratio | Stretch force [N/mm$^2$] | Thickness [μm] | OD (TR924) | OD [X-rite] |
|---|---|---|---|---|---|
| C4/LS1 | 3.3 | 6 | 323 | 0.805 | 0.55 |
| C4/LS2 | 3.3 | 4 | 328 | 0.84 | — |

Transversal stretching was then performed on the longitudinally stretched films with a stretch time of 30 s and stretching speed of 1000%/min under the conditions given in Table 7. The measured thickness and measured optical density with the MacBeth TR924 densitometer in transmission mode with a visible filter are also given in Table 7.

TABLE 7

| Comparative Example nr. | Stretch ratio | Stretch temperature [° C.] | Thickness [μm] | OD TR924 | OD [X-rite] |
|---|---|---|---|---|---|
| C4/LS1/BS1 | 3.3 | 135 | 120 | 0.47 | 0.30 |
| C4/LS2/BS1 | 3.3 | 135 | 124 | 0.53 | 0.33 |

Since there is no contribution to the optical density from void-forming upon biaxial stretching for the composition of COMPARATIVE EXAMPLE 4 as can be seen from COMPARATIVE EXAMPLE 1 to 3, the dependence of optical density upon film thickness can be used to provide a baseline with which to assess the contribution of void-forming to the optical density for those compositions based upon aromatic polyesters with 2% by weight of the same titanium dioxide pigment which form voids upon biaxial stretching.

The Beer-Lambert relationship does not hold for pigmented films with light-scattering pigments such as titanium dioxide. If the film thickness is smaller than the average free path-length of the scattered light, light will escape after scattering otherwise the light does not escape and in fact interferes with further scattered light providing for a quasi-exponential dependence of optical density upon film thickness. The situation is too complex to be able to be described theoretically and hence the only possible approach is to measure the actual optical density observed at particular film thicknesses. The above-mentioned optical density appear to a fair approximation to bee linearly dependent upon the logarithm of the film thickness in the layer thickness range 1084 to 120 μm giving the following relationship:

$$OD = 0.891 \log[\text{thickness in μm}] - 1.3727$$

This relationship provides the optical density attributable to a 2% by weight concentration of the titanium dioxide pigment used as a function of film thickness.

Comparative Examples 5 and 6

The ca. 1100 µm thick extrudates of COMPARATIVE EXAMPLES 5 and 6 all with 2% by weight of titanium dioxide and 15% by weight of TPX 820 were produced by mixing the ingredients in Table 8 in the proportions given in Table 8 and then drying the mixture at 150° C. for 4 hours under vacuum (<100 mbar) before melting in a PET-extruder, extrusion through a sheet die and cooling to produce the extrudates of COMPARATIVE EXAMPLES 5 and 6 summarized in Table 8 together with the isophthalate (IPA):terephthalate (TPA) ratio.

TABLE 8

| Comparative example nr. | PET02 [wt %] | PET04 [wt %] | IPA:TPA ratio | TPX 820 [wt %] | TiO₂ [wt %] |
|---|---|---|---|---|---|
| 5 | 33.3 | 49.7 | 0.0637 | 15 | 2.0 |
| 6 | 83 | — | — | 15 | 2.0 |

Longitudinal stretching was carried out for each extrudate as described in COMPARATIVE EXAMPLES 1 to 3 under the conditions given in Table 9. The expected thickness is the thickness based on the extrudate thickness and longitudinal as observed for non-voided films.

TABLE 9

| Comparative example nr | Longitudinal stretch | | | | | Thickness | | TR924 | | | OD [X-rite] |
|---|---|---|---|---|---|---|---|---|---|---|---|
| | ratio | force [N/mm²] | temperature [° C.] | speed [m/min] | Density [g/mL] | Measured [µm] | Expected [µm] | OD | Expected OD | ΔOD | |
| C5/LS1 | 3.3 | 5.21 | 74 | 4.0 | 1.147 | 500 | 333 | 1.10 | 0.87 | 0.23 | 0.96 |
| C6/LS1 | 3.3 | — | 86 | 4.0 | | | 333 | | | | |

Transversal stretching was then performed on the length-stretched film as described for COMPARATIVE EXAMPLES 1 to 3 with a stretch time of 30 s and stretching speed of 1000%/min under the conditions given in Table 10. The measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density and the difference between the observed optical density and the optical density expected due to the aromatic polyester, ΔOD, are also given in Table 10.

TABLE 10

| Example nr. | Transversal stretch | | Thickness | | | OD TR924 | Expected OD | ΔOD | ΔOD/ OD |
|---|---|---|---|---|---|---|---|---|---|
| | ratio | temperature [° C.] | Density [g/mL] | Measured [µm] | Expected [µm] | | | | |
| C5/LS1/BS1 | 3.5 | 100 | 0.64 | 270 | 95 | 1.09 | 0.39 | 0.70 | 0.642 |
| C6/LS1/BS1 | 3.5 | 100 | 0.48 | 244 | 95 | 1.07 | 0.39 | 0.68 | 0.635 |

The results in Table 10 clearly show very substantial opacification, 64% of the optical density realized being due to void-forming with a matrix of PET04 with TPX as crystalline dispersed phase with a particle size of ca. 10 µm. However, C5/LS1/BS1 exhibited an elasticity (Young's) modulus in the longitudinal direction of 1258 N/mm² and a yield stress in the longitudinal direction of 26.4 N/mm², which were substantially lower than for materials using SAN as opacity-producing agent.

Transparentization was investigated for the biaxially stretched film C6/LS1/BS1 by clamping the film in an Instron 4411 apparatus and observing the changes in optical density and film thickness upon contacting the film with a soldering iron for 5 s at 150° C., 5 s at 190° C. and 5 s at 210° C. at a pressure of 0.5 N/mm². The results of these experiments are given in Table 11, 12 and 13 respectively.

TABLE 11

| Comparative example nr. | OD (TR924) before heating | Thickness before heating [μm] | after heating at 150° C. for 5 s at pressure of 0.5 N/mm² | | % decrease in OD | % Change in thickness at 150° C. |
| --- | --- | --- | --- | --- | --- | --- |
| | | | OD (TR924) | thickness [μm] | | |
| C6/LS1/BS1 | 1.07 | 242 | 1.07 | 224 | 0 | 7.4 |

TABLE 12

| Comparative example nr. | OD (TR924) before heating | Thickness before heating [μm] | after heating at 190° C. for 5 s at pressure of 0.5 N/mm² | | % decrease in OD | % Change in thickness at 190° C. |
| --- | --- | --- | --- | --- | --- | --- |
| | | | OD (TR924) | thickness [μm] | | |
| C6/LS1/BS1 | 1.07 | 245 | 1.08 | 207 | 0 | 15.5 |

TABLE 13

| Comparative example nr. | OD (TR924) before heating | Thickness before heating [μm] | after heating at 210° C. for 5 s at pressure of 0.5 N/mm² | | % decrease in OD | % Change in thickness at 210° C. |
| --- | --- | --- | --- | --- | --- | --- |
| | | | OD (TR924) | thickness [μm] | | |
| C6/LS1/BS1 | 1.07 | 245 | 1.05 | 178 | 1.9 | 27.3 |

There was no significant transparentization even at 210° C. despite a 27.3% change in film thickness. Significant transparentization was only observed at 230° C. at which there was a 29% decrease in optical density and a 55% decrease in film thickness. Film thickness changes at 150° C. and 190° C. of 7.4% and 15.5% respectively coupled with no transparentization indicated an excellent temperature stability.

Comparative Examples 7 and 8

The 1095 μm thick extrudates of COMPARATIVE EXAMPLES 7 and 8 with 2% by weight of titanium dioxide and 15% by weight of SAN 06 were produced by mixing the ingredients in Table 14 in the proportions given in Table 14 and then drying the mixture at 150° C. for 4 hours under vacuum (<100 mbar) before melting in a PET-extruder, extrusion through a sheet die and cooling to produce the extrudates of COMPARATIVE EXAMPLES 7 and 8 summarized in Table 14 together with the isophthalate (IPA):terephthalate (TPA) ratio.

TABLE 14

| Comparative example nr. | PET02 [wt %] | PET04 [wt %] | IPA:TPA ratio | SAN 06 [wt %] | TiO$_2$ [wt %] | OB-one [ppm] |
|---|---|---|---|---|---|---|
| 7 | 33.3 | 49.7 | 0.0637 | 15 | 2.0 | 100 |
| 8 | 56.1 | 36.9 | 0.0725 | 15 | 2.0 | 100 |

Longitudinal stretching was carried out for the extrudate as described in COMPARATIVE EXAMPLES 1 to 3 under the conditions given in Table 15. The expected thickness is the thickness based on the extrudate thickness and longitudinal as observed for non-voided films.

TABLE 15

| Comparative example nr | Longitudinal stretch | | | | | Thickness | | TR924 | | | OD [X-rite] | tear strength ASTM D1938 [N/mm] |
|---|---|---|---|---|---|---|---|---|---|---|---|---|
| | ratio | force [N/mm$^2$] | temperature Raytek [° C.] | speed [m/min] | Density [g/mL] | Measured [μm] | Expected [μm] | OD | Expected OD | ΔOD | | |
| C7/LS1 | 3.3 | 8.1 | 93 | 4.0 | 0.82 | 360 | 332 | 1.03 | 0.87 | 0.16 | 0.82 | |
| C7/LS2 | 3.3 | 10.0 | 82 | 4.0 | 1.08 | 390 | 332 | 1.28 | 0.87 | 0.41 | 1.08 | |
| C8/LS1 | 3.3 | 9.3 | 91 | 4.0 | | 397 | 332 | | 0.87 | | | |
| C8/LS2 | 2.8 | 9.3 | 90 | 4.0 | | 455 | 332 | | | | | 3.4 |

Longitudinal stretching was accompanied by a decrease in density due to void-forming, which increased with decreasing temperature i.e. stretching force. However, whereas for the longitudinal stretching of the extrudate of COMPARATIVE EXAMPLE 7 at a temperature of 93° C. the longitudinal stretching occurred without inhomogeneities in the stretched film, at a temperature of 82° C. inhomogeneities occurred as bumps at the edges of the stretched film.

Transversal stretching was then performed on the length-stretched film as described for COMPARATIVE EXAMPLES 1 to 3 with a stretch time of 30 s and stretching speed of 1000%/min under the conditions given in Table 16. The measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density and the difference between the observed optical density and the optical density expected due to the aromatic polyester, ΔOD, are also given in Table 16.

The results in Table 16 clearly show very substantial opacification, up to 66% of the optical density realized being due to void-forming with a matrix of polyester with an IPA/TPA ratio of 0.0637 with 15% by weight of SAN 06 as amorphous high polymer dispersed phase.

Invention Examples 1 to 5

The ca. 1100 μm thick extrudates of INVENTION EXAMPLES 1 to 5 all with 2% by weight of titanium dioxide, SAN 06 and TPX 820 were produced by mixing the ingredients in the proportions given in Table 17 and then drying the mixture at 150° C. for 4 hours under vacuum (<100 mbar) before melting in a PET-extruder, extrusion through a sheet die and cooling to produce the extrudates of INVENTION EXAMPLES 1 to 5 summarized in Table 17 together with the isophthalate (IPA):terephthalate (TPA) ratio.

TABLE 17

| Invention example nr | PET02 [wt %] | PET04 [wt %] | IPA:TPA ratio | TPX 820 [wt %] | SAN 06 [wt %] | TiO$_2$ [wt %] |
|---|---|---|---|---|---|---|
| 1 | 33.3 | 49.7 | 0.0637 | 14 | 1 | 2.0 |
| 2 | 33.3 | 49.7 | 0.0637 | 7.5 | 7.5 | 2.0 |
| 3 | 33.3 | 49.7 | 0.0637 | 1 | 14 | 2.0 |
| 4 | 45.3 | 37.7 | 0.0476 | 1 | 14 | 2.0 |
| 5 | 44.6 | 38.4 | 0.0485 | 0.5 | 14.5 | 2.0 |

Longitudinal stretching was carried out for each extrudate as described in COMPARATIVE EXAMPLES 1 to 3 under the conditions given in Table 18. The expected thickness is the thickness based on the extrudate thickness and longitudinal as observed for non-voided films.

TABLE 16

| Comparative example nr. | Transversal stretch | | | Thickness | | | | | | OD [X-rite] |
|---|---|---|---|---|---|---|---|---|---|---|
| | ratio | temperature [° C.] | Density [g/mL] | Measured [μm] | Expected [μm] | OD TR924 | Expected OD | ΔOD | ΔOD/OD | |
| C7/LS1/BS1 | 3.5 | 120 | 1.24 | 111 | 95 | 0.93 | 0.39 | 0.54 | 0.58 | 0.69 |
| C7/LS1/BS2 | 3.5 | 110 | 1.19 | 117 | 95 | 0.982 | 0.39 | 0.592 | 0.60 | 0.71 |
| C7/LS1/BS3 | 3.5 | 100 | 1.17 | 119 | 95 | 0.987 | 0.39 | 0.597 | 0.60 | 0.80 |
| C7/LS1/BS4 | 3.5 | 95 | | 124 | 95 | | | | | 0.85 |
| C7/LS1/BS5 | 3.5 | 95 | 1.11 | | 95 | 1.11 | 0.39 | 0.72 | 0.65 | 0.84 |
| C7/LS2/BS1 | 3.5 | 120 | | 140 | 95 | | | | | 0.85 |
| C7/LS2/BS2 | 3.5 | 110 | 1.11 | 129 | 95 | 1.16 | 0.39 | 0.77 | 0.66 | 0.90 |
| C7/LS2/BS3 | 3.5 | 102 | 1.02 | 170 | 95 | | | | | 0.99 |
| C7/LS2/BS4 | 3.5 | 95 | | 190 | 95 | | | | | 1.00 |
| C8/LS1/BS1 | 3.5 | 90 | 0.88 | 168 | 95 | | | | | 1.11 |

TABLE 18

| Invention example nr | TPX 820 [wt %] | SAN 06 [wt %] | Longitudinal stretch | | | | Density [g/mL] | thickness | | Tear strength ASTM D1938 [N/mm] |
|---|---|---|---|---|---|---|---|---|---|---|
| | | | temperature [° C.] | ratio | force [N/mm²] | V1 speed [m/min] | | Measured [µm] | Expected [µm] | |
| 1/LS1 | 14 | 1 | 88 | 3.3 | 4.2 | 4.0 | 0.94 | 379 | 333 | |
| 1/LS2 | 14 | 1 | 72 | 3.3 | 6.3 | 4.0 | 1.04 | 369 | 333 | |
| 2/LS1 | 7.5 | 7.5 | 89 | 3.3 | 5.2 | 4.0 | 1.12 | 336 | 333 | |
| 2/LS2 | 7.5 | 7.5 | 71 | 3.3 | 6.3 | 4.0 | 1.19 | 328 | 333 | |
| 3/LS1 | 1 | 14 | 90 | 3.3 | 7.86 | 4.0 | 1.22 | 364 | 333 | |
| 3/LS2 | 1 | 14 | 76 | 3.3 | 9.75 | 4.0 | 1.18 | 385 | 333 | |
| 4/LS1 | 1 | 14 | 80 | 3.3 | 9.8 | 4.0 | | 443 | 333 | 6.5 |
| 4/LS2 | 1 | 14 | 84 | 2.8 | 6.8 | 4.0 | | 425 | 393 | |
| 5/LS1 | 0.5 | 14.5 | 75 | 3.3 | 9.5 | 4.0 | | 406 | 333 | 6.5 |

The results in Table 18 show with 15% by weight of a dispersed mixture of particles of isotactic poly(4-methyl-1-pentene) (PMP), a crystalline high polymer with a melting point above the glass transition temperature of the linear polyester matrix, and particles of an acrylonitrile-styrene block copolymer (SAN), an amorphous high polymer with a glass transition temperature above that of the linear polyester matrix, that longitudinal stretching was possible without film inhomogeneity down to temperatures lower than 80° C., whereas this was not possible with 15% by weight of SAN for an identical polyester composition (IPA:TPA ratio=0.0637) (see COMPARATIVE EXAMPLE 7). Moreover, although longitudinal stretching was possible with 15% by weight of PMP in the same polyester composition at temperatures below 80° C. (see COMPARATIVE EXAMPLE 5), upon transversal stretching a film was obtained with substantially inferior elasticity (Young's) modulus in the longitudinal direction and yield stress in the longitudinal direction. This was not the case when mixtures of PMP and SAN were dispersed.

The tearing strength of the films of INVENTIVE EXAMPLES 4/LS1 and 5/LS1 with total PMP and SAN concentrations of 15% by weight and concentrations of PMP of 1 and 0.5% by weight respectively longitudinally stretched at stretching forces of 9.8 and 9.5 N/mm² of 6.5 N/mm was approximately double the tearing strength of the film of COMPARATIVE EXAMPLE 8/LS1 with 15% by weight of SAN in a polyester with the same composition longitudinally stretched at a stretching force of 9.3 N/mm of 3.4 N/mm.

Transversal stretching was then performed on the longitudinally stretched films as described for COMPARATIVE EXAMPLES 1 to 3 with a stretch time of 30 s and stretching speed of 1000%/min under the conditions given in Table 19. The density, measured thickness and the expected thickness, i.e. thickness if no void-forming on the basis of the extrudate thickness and the longitudinal and transversal stretch ratios, are also given in Table 19.

TABLE 19

| Invention example nr | IPA:TPA ratio | Transversal stretch | | | Density [g/mL] | Measured thickness [µm] | Expected thickness [µm] |
|---|---|---|---|---|---|---|---|
| | | temperature [° C.] | ratio | speed [%/min] | | | |
| 1/LS1/BS1 | 0.0637 | 100 | 3.5 | 1000 | 0.57 | 239 | 95 |
| 1/LS1/BS2 | 0.0637 | 90 | 3.5 | 1000 | 0.59 | 220 | 95 |
| 1/LS2/BS1 | 0.0637 | 100 | 3.5 | 1000 | | | 95 |
| 1/LS2/BS2 | 0.0637 | 90 | 3.5 | 1000 | | | 95 |
| 2/LS1/BS1 | 0.0637 | 100 | 3.5 | 1000 | — | 136 | 95 |
| 2/LS1/BS2 | 0.0637 | 90 | 3.5 | 1000 | | | 95 |
| 2/LS2/BS1 | 0.0637 | 100 | 3.5 | 1000 | | | 95 |
| 2/LS2/BS2 | 0.0637 | 90 | 3.5 | 1000 | | | 95 |
| 3/LS1/BS1 | 0.0637 | 100 | 3.5 | 1000 | — | 140.5 | 95 |
| 3/LS1/BS2 | 0.0637 | 90 | 3.5 | 1000 | 1.00 | 156 | 95 |
| 3/LS2/BS1 | 0.0637 | 100 | 3.5 | 1000 | 0.92 | 167 | 95 |
| 4/LS2/BS1 | 0.0476 | 100 | 3.5 | 1000 | 1.13 | 167 | 112 |
| 4/LS2/BS2 | 0.0476 | 90 | 3.5 | 1000 | 1.07 | 177 | 112 |
| 5/LS1/BS1 | 0.0485 | 100 | 3.5 | 1000 | 0.85 | 184 | 95 |
| 5/LS1/BS2 | 0.0485 | 90 | 3.5 | 1000 | 0.83 | 218 | 95 |

Transversal stretching resulted in films with densities in the range of 1.07 to 0.57 g/mL and ratios of measured thickness to expected thickness in the range of 1.43 to 2.12 indicating the presence of considerable microvoiding and excellent insulating properties.

Table 20 gives the measured thickness, the expected thickness, the measured optical density with the MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD.

TABLE 20

| Invention example nr | IPA:TPA ratio | TPX 820 [wt %] | SAN 06 [wt %] | OD TR924 | Expected OD | ΔOD | ΔOD/ OD | OD [X-rite] |
|---|---|---|---|---|---|---|---|---|
| 1/LS1/BS1 | 0.0637 | 14 | 1 | 1.08 | 0.39 | 0.69 | 0.64 | 0.88 |
| 1/LS1/BS2 | 0.0637 | 14 | 1 | | | | | 0.84 |
| 1/LS2/BS1 | 0.0637 | 14 | 1 | | | | | 0.86 |
| 1/LS2/BS2 | 0.0637 | 14 | 1 | | | | | 0.85 |
| 2/LS1/BS1 | 0.0637 | 7.5 | 7.5 | 0.97 | 0.39 | 0.58 | 0.60 | 0.77 |
| 2/LS1/BS2 | 0.0637 | 7.5 | 7.5 | | | | | 0.78 |
| 2/LS2/BS1 | 0.0637 | 7.5 | 7.5 | | | | | 0.82 |
| 2/LS2/BS2 | 0.0637 | 7.5 | 7.5 | | | | | 0.84 |
| 3/LS1/BS1 | 0.0637 | 1 | 14 | 1.15 | 0.39 | 0.76 | 0.66 | 0.92 |
| 3/LS1/BS2 | 0.0637 | 1 | 14 | | | | | 0.96 |
| 3/LS2/BS1 | 0.0637 | 1 | 14 | | | | | 1.03 |
| 4/LS2/BS1 | 0.0476 | 1 | 14 | 1.05 | 0.45 | 0.60 | 0.57 | 0.84 |
| 4/LS2/BS2 | 0.0476 | 1 | 14 | | | | | 0.91 |
| 5/LS1/BS1 | 0.0485 | 0.5 | 14.5 | 1.32 | 0.39 | 0.93 | 0.70 | 1.10 |
| 5/LS1/BS2 | 0.0485 | 0.5 | 14.5 | | | | | 1.12 |

The results of Table 20 show that at approximately the same stretching temperature the contribution to the optical density of biaxially stretched films of microvoiding increases was extremely high for all the films.

The transparentization of these films was investigated for several of the biaxially stretched films by clamping the films in an Instron 4411 apparatus and observing the changes in film thickness and optical density upon contacting the films with a soldering iron for 5 s at 150° C. and 190° C. The results of these experiments are given in Tables 20 and 21.

TABLE 20

| Invention example nr. | OD (TR924) before heating | Thickness before heating [μm] | after heating at 150° C. for 5 s at pressure of 0.5 N/mm² | | % decrease in OD | Change in thickness at 150° C. [%] |
|---|---|---|---|---|---|---|
| | | | OD (TR924) | thickness [μm] | | |
| 1/LS1/BS1 | 1.08 | 203 | 1.07 | 178 | 0 | 12.3 |
| 2/LS1/BS1 | 0.97 | 139 | 0.91 | 121 | 6 | 12.9 |
| 3/LS1/BS1 | 1.13 | 140 | 0.87 | 118 | 23 | 15.7 |
| 4/LS2/BS1 | 1.05 | 167 | 0.86 | 147 | 18 | 12.0 |
| 5/LS1/BS1 | 1.32 | 182 | 1.03 | 131 | 22 | 28.0 |

TABLE 21

| Invention example nr. | OD (TR924) before heating | Thickness before heating [μm] | after heating at 190° C. for 5 s at pressure of 0.5 N/mm² | | % decrease in OD | Change in thickness at 190° C. [%] |
|---|---|---|---|---|---|---|
| | | | OD (TR924) | thickness [μm] | | |
| 1/LS1/BS1 | 1.07 | 204 | 1.06 | 163 | 0.9 | 20.1 |
| 2/LS1/BS1 | 0.955 | 133 | 0.86 | 105 | 9.9 | 21.0 |
| 3/LS1/BS1 | 1.16 | 139 | 0.70 | 102 | 39.6 | 26.6 |
| 4/LS2/BS1 | 1.05 | 166 | 0.72 | 131 | 31.4 | 21.1 |
| 5/LS1/BS1 | 1.32 | 180 | 0.77 | 112 | 41.7 | 37.8 |

For similar changes in film thickness, the percentage decrease in optical density was much higher at PMP-concentrations of 0.5 and 1.0% by weight [3/LS1/BS1, 4/LS2/BS1 and 5/LS1/BS1] than at PMP-concentrations of 7.5 and 14% by weight [1/LS1/BS1 and 2/LS1/BS1].

Invention Examples 6 and 7

A ca. 1100 μm thick extrudate with the composition given in Table 22 below was biaxially stretched according to the conditions given in Table 23 to provide a non-transparent microvoided biaxially stretched self-supporting film with a thickness of 150 μm.

TABLE 22

| Invention example nr | IPA:TPA ratio | PET02 [wt %] | PET04 [wt %] | SAN 06 [wt %] | TiO$_2$ [wt %] | TPX 820 [wt %] | UVITEX OB-one [wt %] |
|---|---|---|---|---|---|---|---|
| 6 | 0.0769 | 23.734 | 59.30 | 15.00 | 1.95 | — | 0.0260 |
| 7 | 0.0769 | 23.613 | 59.00 | 14.92 | 1.945 | 0.497 | 0.0259 |

TABLE 23

| | Longitudinal stretching | | Transversal stretch | | | |
|---|---|---|---|---|---|---|
| Invention example nr | ratio | force [N/mm$^2$] | temperature [° C.] | ratio | speed [%/min] | Density [g/mL] |
| 6/LS1/BS1 | 3.3 | 12 | 110 | 3.5 | 1000 | 1.2 |
| 7/LS1/BS1 | 3.3 | 12 | 110 | 3.5 | 1000 | 1.2 |

The non-transparent microvoided biaxially stretched self-supporting films 1/LS1/BS1 and 2/LS1/BS1 were then subbed with the subbing layer composition given below on one or both sides of the support:

| | wt % solids in coating dispersion | coverage in dried layer [mg/m$^2$] |
|---|---|---|
| poly(3,4-ethylenedioxythiophene)/ polystyrenesulphonic acid (1:2.46 by weight) sorbitol | 6.01 | 2.838 |
| | 28.06 | [13*] |
| Proxel Ultra 5 | 0.03 | 0.01 |
| Surfactant S01, a non-ionic surfactant | 1.66 | 0.78 |
| a terephthalic acid, isophthalic acid, 5-sulfo-isophthalic acid, ethylene glycol (53:40:7:100 molar ratio) copolyester | 64.24 | 30.2 |

*will substantially evaporate/sublime during the drying process

Finally the subbed non-transparent microvoided biaxially stretched self-supporting film of INVENTION EXAMPLES 6 and 7 were coated with compositions 1 and 2 given in Table 25 below:

TABLE 25

| Invention example nr | Joncryl FLX5010 from BASF [wt %] | Syloid 244 from Grace [wt %] | Erkol 4820 from Acetex [wt %] | 8 μm PMMA matting agent [wt %] | Zonyl FSO100 from DuPont [wt %] | Proxel [wt %] | Coating wt [g/m$^2$] |
|---|---|---|---|---|---|---|---|
| coating 1 | 47.58 | 47.48 | 4.76 | — | 0.18 | | |
| coating 2 | 46.62 | 46.51 | 4.66 | 2.0 | 0.17 | 0.004 | 4.94 |

The results printable papers were then subjected to printing tests using a Heidelberg GT052 printing press equipped with a Dahlgren fountain system, which allowed the quantity of fountain by printing to be accurately set. During the printing first the quantity of fountain was varied for a constant quantity of ink and then the quantity of fountain was kept constant and the quantity of ink varied. The resulting prints were evaluated on the basis of solid optical densities and dot gain with a Gretag Spectroeye densitometer with the results being given in Table 26.

TABLE 26

| Invention example nr | coating 1 | coating 2 |
|---|---|---|
| Fountain environment | | |
| optimum | 55% Dg | 60% Dg |
| window below | 25% | 25% |
| window above | 20% | 25% |
| Ink environment | | |
| optimum ink setting | 8 | 8 |
| window below | 4 | 4 |
| window above | 6 | 10 |
| dot gain for 50% screen at optimum setting | | |
| Gretag Spectroeye | 19% | 16% |

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A non-transparent microvoided biaxially stretched self-supporting non-laminated polymeric film, the film comprising linear polyester as a continuous phase and dispersed uniformly therein an amorphous high polymer comprising at least one chain-polymerized block with a higher glass transition temperature than the glass transition temperature of said continuous phase and isotactic poly(4-methyl-1-pentene), wherein said linear polyester consists essentially of aromatic dicarboxylate and aliphatic dimethylene monomer units, wherein the combined concentration of said uniformly dispersed amorphous high polymer and isotactic poly(4-methyl-1-pentene) in said film is 5 to 35% by weight.

2. The polymeric film according to claim 1, wherein said concentration of isotactic poly(4-methyl-1-pentene) is 15% by weight or less.

3. The polymeric film according to claim 1, wherein said concentration of isotactic poly(4-methyl-1-pentene) is at least 0.02% by weight.

4. The polymeric film according to claim 1, wherein said amorphous high polymer comprising at least one chain-polymerized block is selected from the group consisting of polystyrene, styrene copolymers, styrene-acrylonitrile-polymers (SAN-polymers), polyacrylates, acrylate-copolymers, polymethacrylates and methacrylate-copolymers.

5. The polymeric film according to claim 4, wherein said styrene copolymers are selected from the group consisting of SAN-polymers and graft polymers of acrylonitrile, butadiene, and styrene (ABS-polymers).

6. The polymeric film according to claim 5, wherein the concentration of acrylonitrile monomer units in said SAN-polymer is 15 to 35% by weight.

7. The polymeric film according to claim 6, wherein the weight ratio of said linear polyester to said SAN-polymer is in the range of 3.5:1 to 15.0:1.

8. The polymeric film according to claim 1, wherein said film further comprises at least one inorganic opacifying pigment.

9. The polymeric film according to claim 1, wherein said aromatic dicarboxylate monomer units are selected from the group consisting of terephthalate, isophthalate and naphthalene dicarboxylates.

10. The polymeric film according to claim 1, wherein said aliphatic dimethylene monomer units are selected from the group consisting of ethylene, diethylene ether, tetramethylene, neopentylene and 1,4-cyclohexanedimethylene.

11. The polymeric film according to claim 1, wherein 30 mole % or less of said aromatic dicarboxylate monomer units in said linear polyester are isophthalate monomer units.

12. The polymeric film according to claim 1, wherein at least 3 mole % of said aromatic dicarboxylate monomer units in said linear polyester are isophthalate monomer units.

13. The polymeric film according to claim 1, wherein said film has an apparent density of 1.1 g/mL or less.

14. A process for printing comprising printing on a synthetic paper which is the non-transparent microvoided biaxially stretched self-supporting non-laminated polymeric film of claim 1.

15. A process for producing a transparent pattern comprising the step of: image-wise applying heat optionally supplemented by the application of pressure to the non-transparent microvoided biaxially stretched self-supporting non-laminated polymeric film of claim 1.

* * * * *